US012667217B2

(12) United States Patent
Kim

(10) Patent No.: US 12,667,217 B2
(45) Date of Patent: Jun. 30, 2026

(54) FOOD PROCESSOR

(71) Applicant: NUC ELECTRONICS CO., LTD.,
Daegu (KR)

(72) Inventor: Jong Boo Kim, Daegu (KR)

(73) Assignee: NUC ELECTRONICS CO., LTD.,
Daegu (KR)

( * ) Notice: Subject to any disclaimer, the term of this
patent is extended or adjusted under 35
U.S.C. 154(b) by 784 days.

(21) Appl. No.: 17/793,820

(22) PCT Filed: Sep. 3, 2021

(86) PCT No.: PCT/KR2021/011943
§ 371 (c)(1),
(2) Date: Jul. 19, 2022

(87) PCT Pub. No.: WO2022/050765
PCT Pub. Date: Mar. 10, 2022

(65) Prior Publication Data
US 2023/0180958 A1     Jun. 15, 2023

(30) Foreign Application Priority Data

Sep. 4, 2020    (KR) ........................ 10-2020-0113243
Aug. 19, 2021    (KR) ........................ 10-2021-0109465

(51) Int. Cl.
*A47J 19/06*        (2006.01)
*A47J 19/02*        (2006.01)
*G10K 1/00*        (2006.01)

(52) U.S. Cl.
CPC .............. *A47J 19/025* (2013.01); *G10K 1/00*
(2013.01)

(58) Field of Classification Search
CPC ........ A47J 19/025; A47J 19/06; A47J 43/075;
G10K 1/00
See application file for complete search history.

(56) References Cited

U.S. PATENT DOCUMENTS 8,474,374 B2 *   7/2013   Trovinger ................ A23N 1/02
99/503

FOREIGN PATENT DOCUMENTS

| CN | 108618561 A | 10/2018 |
|----|----|----|
| CN | 108670001 A | 10/2018 |
| CN | 208909671 U | 5/2019 |
| CN | 110141102 A | 8/2019 |
| CN | 111263603 A | 6/2020 |
| JP | S60-139212 A | 7/1985 |
| KR | 20-0208880 Y1 | 1/2001 |
| KR | 10-2005-0079839 A | 8/2005 |

(Continued)

OTHER PUBLICATIONS

The Extended European Search Report for European Patent Application No. 21864724.6 dated Jun. 19, 2024.

*Primary Examiner* — Tiffany T Tran

(57) ABSTRACT

A food processor according to an embodiment of the present invention comprises: a body; a container detachably coupled to the body; a screw connected to the body while being at least partially received in the container; a juicing filter arranged to surround the tip side of the screw; and a cover detachably coupled to the leading end side of the container, wherein the container includes a first safety switch exposed toward the leading end side, and the first safety switch is switched to an ON state by the juicing filter in a state where the cover is coupled to the container.

8 Claims, 30 Drawing Sheets

1

(56)         References Cited

FOREIGN PATENT DOCUMENTS

| KR | 10-0524658 | B1 |   | 10/2005 |   |   |
|----|------------|----|---|---------|---|---|
| KR | 200437087 | Y1 | * | 11/2007 | ............... | A23L 2/02 |
| KR | 10-2012-0126058 | A |   | 11/2012 |   |   |
| KR | 101319762 | B1 | * | 10/2013 | ............ | A47J 19/025 |
| KR | 10-1480934 | B1 |   | 1/2015 |   |   |
| KR | 20-0490467 | Y1 |   | 11/2019 |   |   |
| KR | 10-2071235 | B1 |   | 1/2020 |   |   |

* cited by examiner

FOOD PROCESSOR

CROSS REFERENCE TO RELATED APPLICATIONS

The present application is a National Phase of International Application No. PCT/KR2021/011943 filed on Sep. 3, 2021, which claims the priority benefit of Korean Patent Application Nos. 10-2020-0113243, filed on Sep. 4, 2021, and 10-2021-0109465, filed on Aug. 19, 2021, in the Korean Intellectual Property Office, the disclosures of which are incorporated herein by reference.

TECHNICAL FIELD

The present disclosure relates to a food processor, and more particularly, to a food processor which juices a food ingredient.

BACKGROUND ART

Various food processors such as a blender, a juicer for green vegetable juice, a slow juicer, and the like have been used for crushing, mixing, juicing, etc.

Meanwhile, many of the food processors described above use screws which rotate at a low speed, and crush and juice food ingredients. The screws may be exposed to the outside even when a container of the food processor is mounted on a body, and a safety accident may occur when the screw rotates in a state of being exposed to the outside.

In addition, even when a cover covering the screw is mounted in the container, the cover may be separated by the thrust of the screw when the screw is operated while the cover is not fixed to the container, and as a result, a safety accident may occur.

DISCLOSURE

Technical Problem

An object to be solved b the present disclosure is to provide a food processor in which a safety accident occurrence possibility is low.

Further, an object is to provide a food processor in which assembly/disassembly convenience of a container is enhanced.

The objects of the present disclosure are not limited to the aforementioned objects, and other objects, which are not mentioned above, will be apparent to a person having ordinary skill in the art from the following description.

Technical Solution

In order to solve the problem, a food processor according to an embodiment of the present disclosure includes: a body; a container detachably coupled to the body; a screw connected to the body while at least a part is accommodated in the container; a juicing filter disposed to cover a front end side of the screw; and a cover detachably coupled to the front end side of the container.

The container includes a first safety switch exposed toward the front end side.

The first safety switch is switched to an ON state by the juicing filter while the cover is coupled to the container.

The body may include a second safety switch switched to the ON state as the first safety switch is switched, and a motor providing power to the screw while the second safety switch is switched to the ON state.

The first safety switch may be exposed to a front end side and a base side of the container, the container may be coupled to the body so that the base side of the first safety switch is aligned with the second safety switch, and the second safety switch may be switched to the ON state as the cover is coupled to the container and the juicing filter presses the first safety switch.

The first safety switch is maintained in a state in which one side protrudes to the front end side of the container in the OFF state and the other side protrudes to the base side of the container in the ON state to switch the second safety switch to the ON state.

The container may further include a cover coupling unit formed on a front end and coupled to the cover, and a filter support unit formed at a base side rather than the cover coupling unit and contacting the juicing filter, and the first safety switch may be provided to be retractable from the filter support unit.

The container may further include an elastic member elastically supporting the first safety switch, and the first safety switch may protrude from the filter support unit by elastic force of the elastic member.

The cover presses the juicing filter to the container side while being coupled to the container to allow the juicing filter to switch the first safety switch to the ON state.

The body may include a locking member fixing the container to the body, and the locking member may be provided to move between a first position which allows the container to be separated from the body and a second position which allows the container to be fixed to the body.

The locking member may permit the base side of the container to enter the inside of the body or to be separated from the body at the first position, and prevent the base side of the container from being separated from the body at a second position.

The container may further include a first coupling end which protrudes on the base side, and the locking member may include a second coupling end which protrudes toward an accommodation space accommodating the base side of the container, and the second coupling end may be located to cross the first coupling end at the first position and press the first coupling end to the container side at the second position.

The body may include a coupling end accommodation groove accommodating the first coupling end and a support end preventing the first coupling end from rotating in a rotational direction of the screw, and the second coupling end may be aligned with the support end at the first position in line and aligned with the coupling end accommodation groove at the second position in line.

The body may include a second safety switch switched to the ON state as the first safety switch is switched, and a motor providing power to the screw while the second safety switch is switched to the ON state.

The locking member may have a slit which moves along the second safety switch so that the second safety switch maintains an exposed state while the locking member moves between the first position and the second position.

The body may further include a sound generation unit generating a sound when the locking member is switched from the first position to the second position.

The sound generation unit may include a hitting portion, an elastic member elastically supporting the hitting portion, and a hit portion aligned with the hitting portion while the locking member is located at the second position, and when the locking member is switched from the first position to the second position, the hitting portion collides with the hitting portion by elastic force of the elastic member to generate the sound.

The container may further include a switch housing which disposing the first safety switch inside, and a switch packing disposed adjacent to the first safety switch so as to prevent juice from penetrating the inside of the switch housing through a portion where the first safety switch is exposed.

The food processor may further include a packing ring disposed between the container and the cover so as to prevent the juice passing through the juicing filter from leaking to the outside of the cover.

In order to solve the problem, a food processor according to an embodiment of the present disclosure includes: a body; a container including a first safety switch and detachably coupled to the body; a screw connected to the body while at least a part is accommodated in the container; a juicing filter disposed to cover a front end side of the screw; a cover detachably coupled to the front end side of the container; and a locking member fixing the container to the body, and the first safety switch is switched to an ON state by the juicing filter while the cover is coupled to the container, and the body includes a lock safety switch switched to the ON state while the container is fixed to the body.

The body may further include a second safety switch switched to the ON state as the first safety switch is switched to the ON state, and a motor providing power to the screw while the second safety switch and the lock safety switch are switched to the ON state.

The first safety switch may include a magnetic body of which relative distance from the second safety switch is changed as being switched from an OFF state to the ON state, and the second safety switch may include a switching magnetic body to be switched to the ON state based on a change in relative distance from the magnetic body.

The locking member may be movable between a first position which allows the container to be separated from the body and a second position which allows the container to be fixed to the body, and the lock safety switch may be switched to the ON state while the locking member moves to the second position.

At least a part of the lock safety switch is formed to be retractable from the body so that the lock safety switch is in the OFF state in a protruding state and the ON state in an inserted state, the locking member may include a pressing member which rotates integrally with the locking member and protrudes toward the body, and inserts at least a part of the lock safety switch into the body when the locking member is located at the second position.

At least one of the pressing member and the lock safety switch may include an inclined surface which allows the lock safety switch to slide along an outline of the pressing member when the pressing member presses the lock safety switch.

At least a part of the lock safety switch may be formed to be retractable from the body so that the lock safety switch is in the ON state in a protruding state and an OFF state in an inserted state, an accommodation slot capable of accommodating at least a part of the lock safety switch may be formed on one surface of the locking member, when the locking member is located at the first position, the lock safety switch is pressed by one surface of the locking member to insert at least a part into the body, and when the locking member is located at the second position, at least a part of the lock safety switch protrudes and is accommodated in the accommodation slot.

At least one of the accommodation slot and the lock safety switch may include an inclined surface which allows the lock safety switch to slide along the outline of the accommodation slot when the lock safety switch is accommodated in the accommodation slot.

The locking member may include a magnetic body which rotates integrally with the locking member, and the lock safety switch may include a lead switch sensing magnetic force of the magnetic body, and switched to the ON state by the magnetic force of the magnetic body when the locking member is located at the second position.

The body may further include an anti-separation member coupled to the housing so as to form a gap to which a part of the locking member is coupled to prevent the locking member from being separated from the body.

The anti-separation member may include a protrusion portion coupled to the housing, and a fixation flange which protrudes in an outer direction from the protrusion portion at a front end side of the protrusion and forming the gap with the housing, and the locking member may include a rotation ring accommodating the protrusion portion, and an inner flange which extends toward the center of the rotation ring in the rotation ring to be inserted into the gap and of which movement is limited by the housing to prevent the separation from the body.

An accommodation space accommodating the base side may be defined between a front end of the protrusion portion and an inner wall of the rotation ring, the container may further include a first coupling end which protrudes on the base side, the rotating ring may include a second coupling end which protrudes toward the accommodation space, and the second coupling end may be located to cross the first coupling end at the first position and press the first coupling end to the protrusion side at the second position.

The fixation flange may include a coupling end accommodation groove accommodating the first coupling end and a support end preventing the first coupling end from rotating in a rotational direction of the screw, and the second coupling end may be aligned with the support end at the first position in line and aligned with the coupling end accommodation groove at the second position in line.

In order to solve the problem, a food processor according to an embodiment of the present disclosure includes: a body including a motor; a container detachably coupled to the body; a screw connected to the body while at least a part is accommodated in the container; a juicing filter disposed to cover a front end side of the screw; a cover detachably coupled to the front end side of the container; a locking member fixing the container to the body; a first safety switch disposed in the container, and switched to an ON state when the cover is mounted on the container; a second safety switch disposed in the body, and identifying whether the first safety switch is in the ON state while the container is mounted on the body; a lock safety switch disposed in the body, and identifying whether the container is in a state of being fixed by the locking member; and a control unit controlling the motor while the first safety switch is ON and the container is fixed by the locking member.

The locking member may be movable between a first position which allows the container to be separated from the body and a second position which allows the container to be fixed to the body, and when the locking member moves to the second position, the lock safety switch is switched to the ON state to identify whether the container is fixed.

At least a part of the lock safety switch is formed to be retractable from the body so that the lock safety switch is in the OFF state in a protruding state and the ON state in an inserted state, the locking member may include a pressing member which rotates integrally with the locking member and protrudes toward the body, and inserts at least a part of the lock safety switch into the body when the locking member is located at the second position.

At least a part of the lock safety switch may be formed to be retractable from the body so that the lock safety switch is in the ON state in a protruding state and an OFF state in an inserted state, an accommodation slot capable of accommodating at least a part of the lock safety switch may be formed on one surface of the locking member, when the locking member is located at the first position, the lock safety switch is pressed by one surface of the locking member to insert at least a part into the body, and when the locking member is located at the second position, at least a part of the lock safety switch protrudes and is accommodated in the accommodation slot.

The locking member may include a magnetic body which rotates integrally with the locking member, and the lock safety switch may include a lead switch sensing magnetic force of the magnetic body, and switched to the ON state by the magnetic force of the magnetic body when the locking member is located at the second position.

Details of the present disclosure will be included in the detailed description and the drawings.

Advantageous Effects

The following effects are at least achieved by embodiments of the present disclosure.

By preventing rotation of a screw while a cover is not coupled to a container, a safety accident which occurs as the screw rotates while being exposed to an external space can be prevented.

Further, by preventing the rotation of the screw while the container is not fixed to a body, a safety accident which occurs as the container is separated from the body during a rotating operation of the screw can be prevented.

Further, a user inserts the container into the body, and then couples the container and the body by rotating a locking member coupled to the body, and as a result, assembly/disassembly convenience of the container by the user is enhanced.

The effects according to the present disclosure are not limited by the contents exemplified above, and other various effects are included in the present specification.

DESCRIPTION OF DRAWINGS

FIG. 2 is an exploded perspective view for the food processor according to an embodiment of the present disclosure.

FIG. 13 is a diagram expressing a state in which the juicing filter is closely attached to the container of the food processor according to an embodiment of the present disclosure.

FIG. 14 is an exploded perspective view illustrating a power transmission unit, a locking member, and an anti-separation member of the food processor according to an embodiment of the present disclosure.

MODE FOR DISCLOSURE

Figure 1:
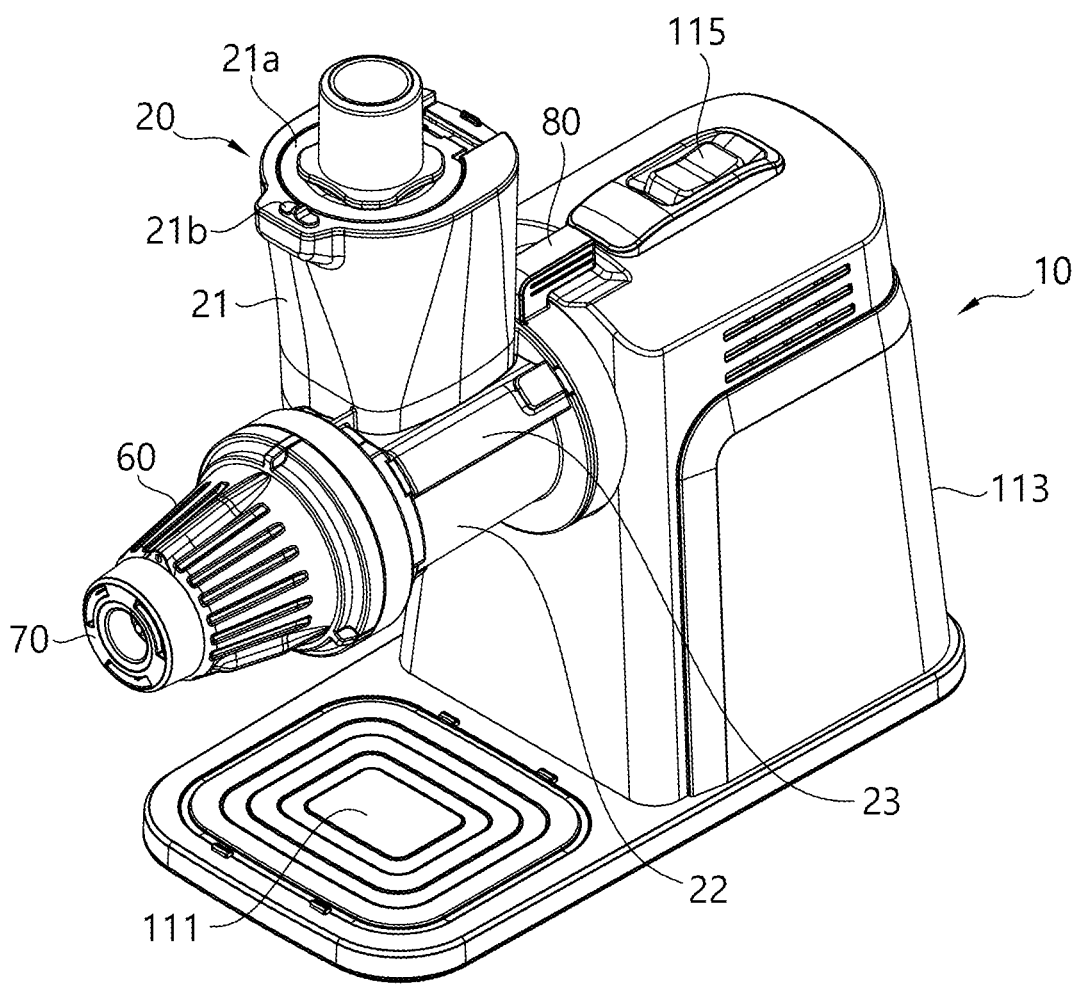
FIG. 1 is a perspective view illustrating a food processor according to an embodiment of the present disclosure.

Advantages and features of the present disclosure, and methods for accomplishing the same will be more clearly understood from embodiments described in detail below with reference to the accompanying drawings. However, the present disclosure is not limited to the embodiments set forth below, and may be embodied in various different forms. The present embodiments are just for rendering the disclosure of the present disclosure complete and are set forth to provide a complete understanding of the scope of the invention to a person with ordinary skill in the technical field to which the present disclosure pertains, and the present disclosure will only be defined by the scope of the claims.

Further, the embodiments described in the present specification will be described with reference to ideal exemplary cross-sectional views and/or schematic views of the present disclosure. Therefore, a form of an exemplary diagram may be modified by manufacturing technology and/or tolerance. Further, respective components in each drawing illustrated in the present disclosure may be illustrated to be slightly enlarged and reduced by considering convenience of description. Throughout the whole specification, the same reference numerals denote the same elements.

Hereinafter, the present disclosure will be described with reference to drawings for describing a food processor according to an embodiment of the present disclosure. Hereinafter, as an example of the food processor, the food processor is described based on a juicer for green vegetable juice, but the present disclosure is not limited to the juicer for green vegetable juice, and a food processor performing a similar function to a juicing filter for squeezing the juice of a food ingredient is included in the present disclosure.

Figure 2:
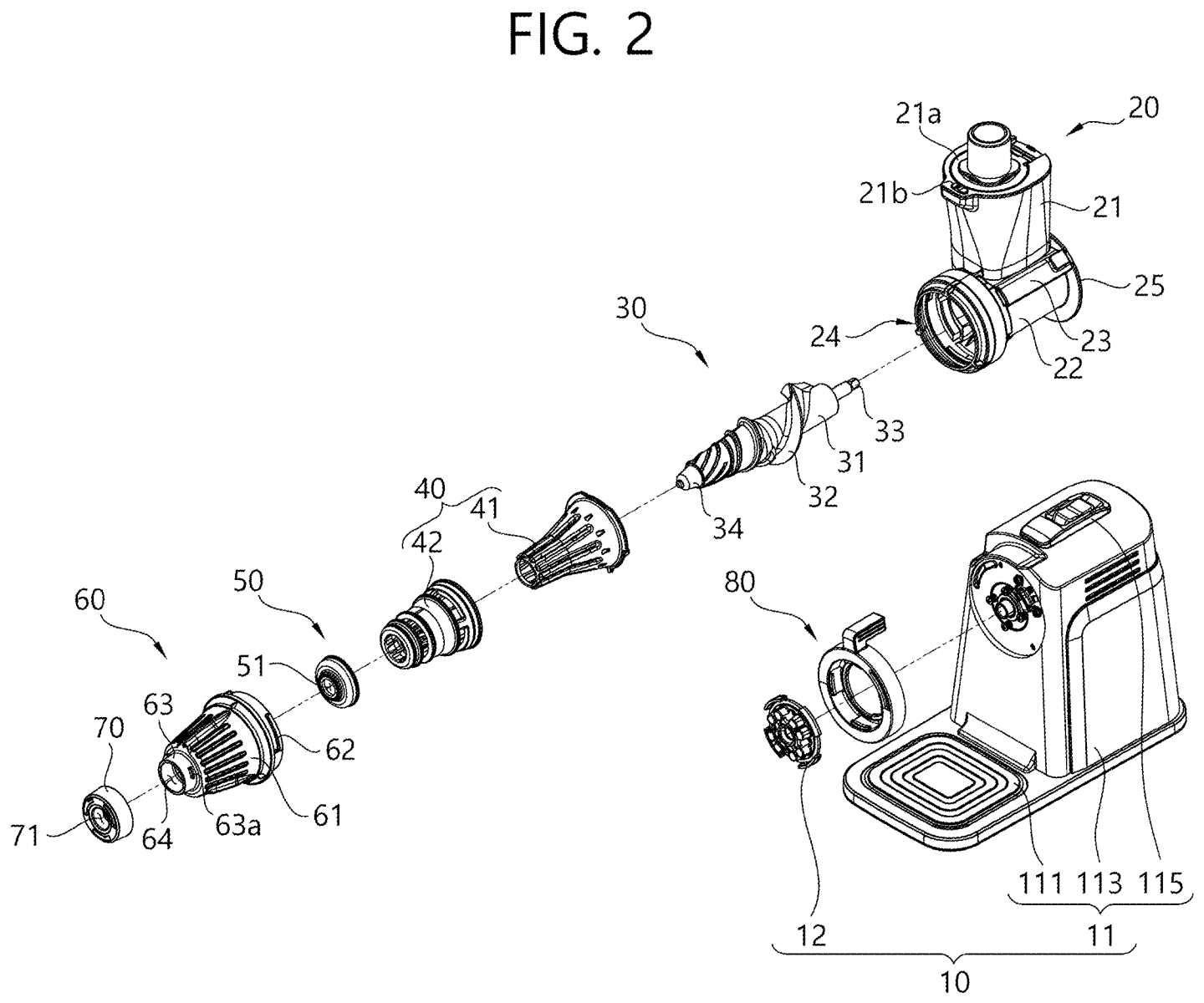
Figure 3:
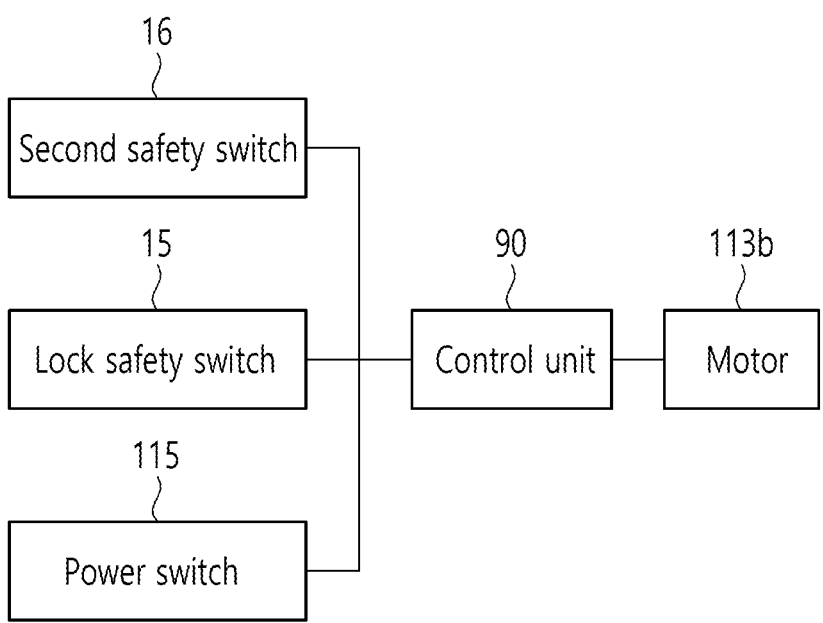
FIG. 3 is a block diagram for describing a connection relationship of a second safety switch, a lock safety switch, a power switch, a control unit, and a motor of the food processor according to an embodiment of the present disclosure.
Figure 4:
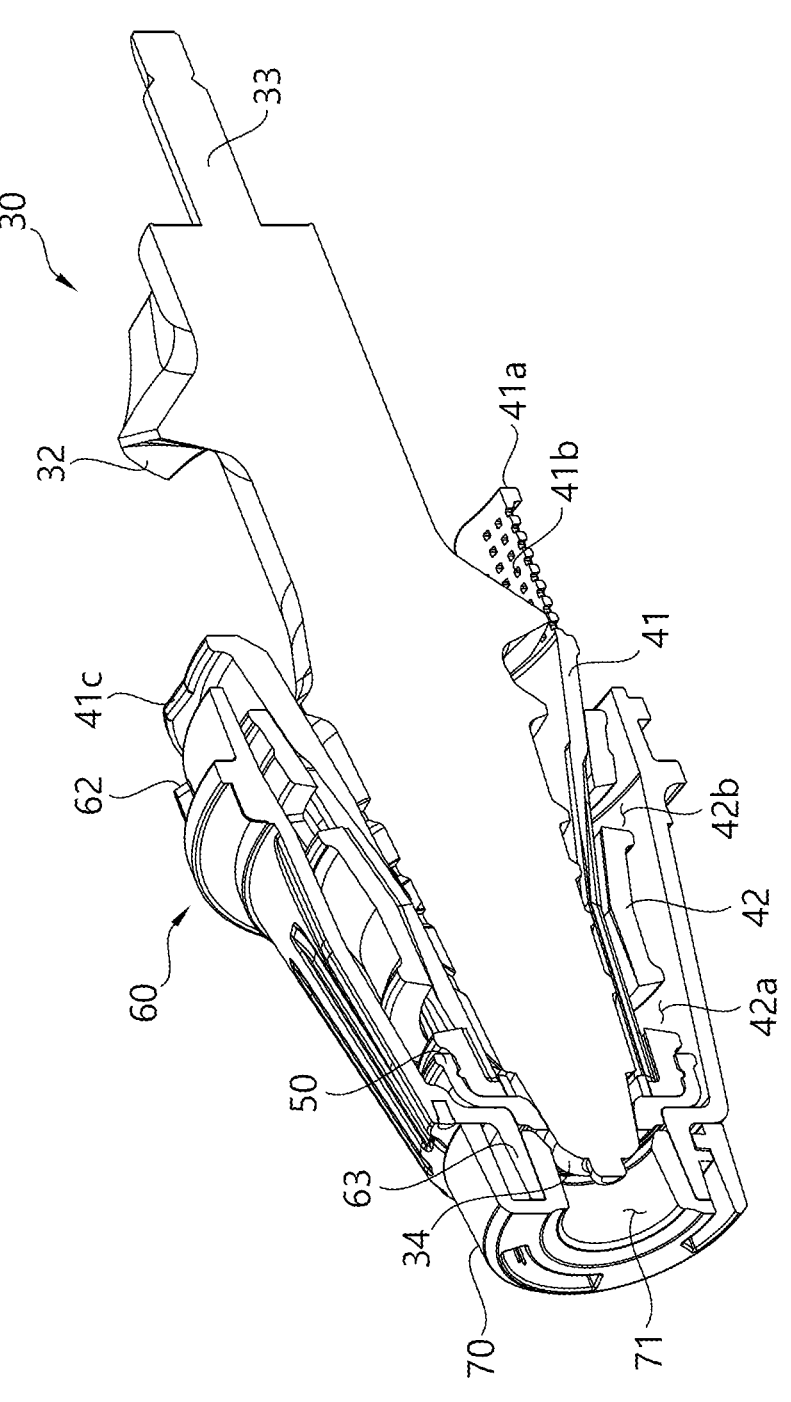
FIG. 4 is a cross-sectional view illustrating a state in which a screw, a juicing filter, a juice discharge prevention member, a cover, and an adjustment cap of the food processor are assembled according to an embodiment of the present disclosure.
Figure 5:
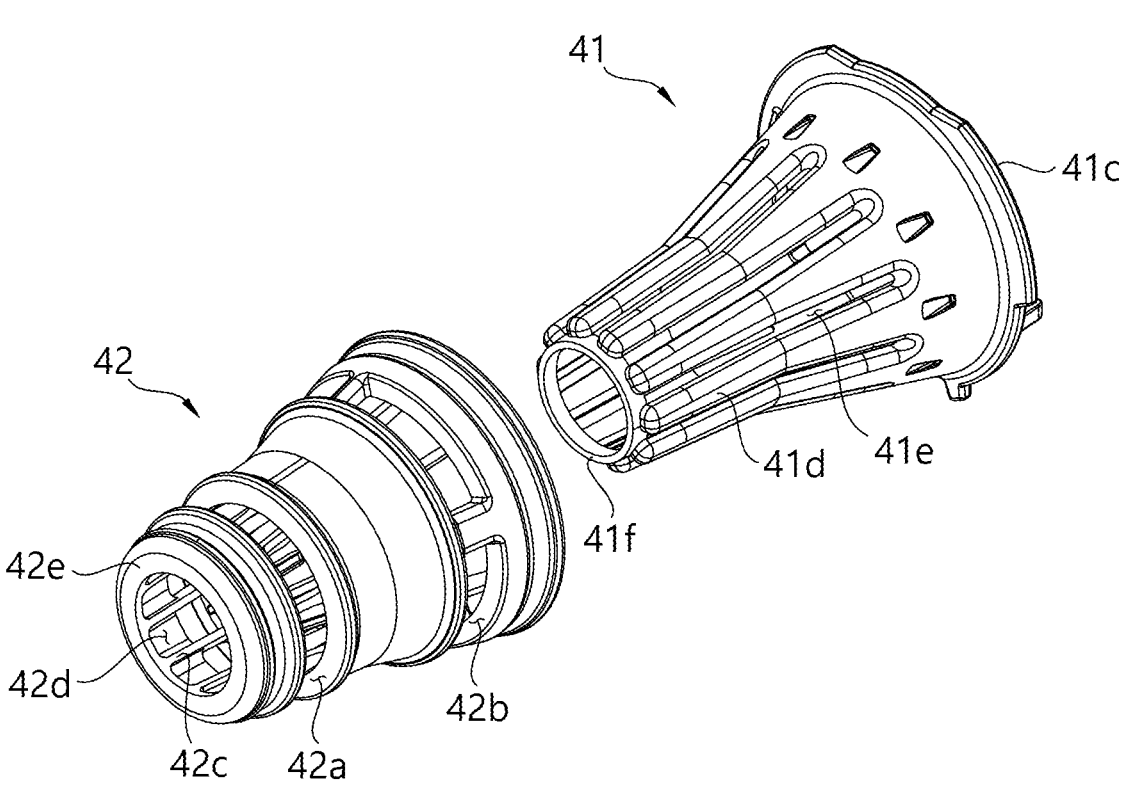
FIG. 5 is an exploded perspective view for the juicing filter of the food processor according to an embodiment of the present disclosure.

FIG. 1 is a perspective view illustrating a food processor according to an embodiment of the present disclosure, FIG. 2 is an exploded perspective view for the food processor according to an embodiment of the present disclosure, FIG. 3 is a block diagram for describing a connection relationship of a second safety switch, a lock safety switch, a power switch, a control unit, and a motor of the food processor according to an embodiment of the present disclosure, FIG. 4 is a cross-sectional view illustrating a state in which a screw, a juicing filter, a juice discharge prevention member, a cover, and an adjustment cap of the food processor are assembled according to an embodiment of the present disclosure, and FIG. 5 is an exploded perspective view for the juicing filter of the food processor according to an embodiment of the present disclosure.

As illustrated in FIGS. 1 and 2, the food processor 1 according to an embodiment of the present disclosure includes a body 10, a container 20, a screw 30, a juicing filter 40, a juice discharge prevention member 50, a cover 60, an adjustment cap 70, a locking member 80, and a control unit 90.

The body 10 includes a stage 111, a power transmission unit 11, and an anti-separation member 12.

The stage 111 provides a place on which a container (not illustrated) receiving juice which is a result juiced by the food processor 1. Grooves or ribs having a substantially closed loop shape may be formed on the top of the stage 111 in various sizes so that the container is stably located on the stage 111 in response to various sizes.

Further, the power transmission unit 11 includes a housing 113 and a power switch 115.

A motor 113b providing power transmitted to the screw 30, a circuit component for controlling the motor 113b, and a reducer connected to an output shaft of the motor 113b are provided in the housing 113.

The power switch 115 is provided outside the housing 113. The power switch 115 is a switch that operates the motor 113b in the housing 113.

A shift insertion hole 18 into which a shaft 33 of the screw 30 is inserted is formed on one side of the housing 113. The shaft 33 inserted through the shaft insertion hole 18 is connected to a reducer (not illustrated) that transmits an output of the motor 113b.

However, the present disclosure is not limited in the above-described case, and according to the embodiment, the shaft insertion hole 18 may be configured to be connected to the reducer and rotate the shaft 33 while accommodating the shaft 33. Specifically, in this case, the shaft insertion hole 18 itself may be configured to rotate by the reducer and provided to rotate the shaft 33 accommodated therein.

Meanwhile, the anti-separation member 12 is a component for fixing the locking member 80 to the housing 113, and detailed contents thereof will be described below.

The locking member 80 is a component that is mounted on the housing 113 and fixes the container 20 to the body 10, and detailed contents thereof will be described below.

The control unit 90 is a component that controls driving of the motor 113b of the food processor 1 according to an embodiment of the present disclosure.

Specifically, the control unit 90 may be a component that controls whether to operate the motor 113b according to the second safety switch 16 and the lock safety switch 15 to be described below being in an ON state or an OFF state even though the power switch 115 is switched to operate the motor 113b.

For example, the control unit 90 determines states of the second safety switch 16 and the lock safety switch 15 by an electrical signal, a mechanical interlocking structure, infrared sensing, magnetic force sensing, and/or other schemes to control the motor 113b to rotate only when both the second safety switch 16 and the lock safety switch 15 are in the ON state. Detailed contents of the lock safety switch 15 and the second safety switch 16 will be described below.

The container 20 is detachably coupled to the body 10, and includes a material input unit 21, a material transfer unit 22, and a first safety switch unit 23.

An inlet cover 21a for opening/closing a material inlet (non-reference numeral) may be provided on the top of the material inlet 21. Further, a lock switch 21*b* capable of fixing the inlet cover 21*a* may be provided on the top of the material inlet 21.

The material input unit 21 is formed in a cylindrical shape in which the material input unit 21 extends roughly perpendicularly downward and an internal space of the material input unit 21 is formed to be in communication with the internal space of the material transfer unit 22. Accordingly, the food ingredient input through the material inlet falls to the inside of the material transfer unit 22 through the internal space of the material input unit 21.

As an example, the material input unit 21 may be provided asymmetric to the material transfer unit 22. That is, the material input unit 21 is disposed eccentrically to the material transfer unit 22 so that one surface is in contact with an upper side of the material transfer unit 22 and the other surface is in contact with a side portion and a lower side of the material transfer unit 22. Accordingly, since the food ingredient which falls to the material transfer unit 22 along the material input unit 21 is eccentric to the other side of the material transfer unit 22 and introduced into the material transfer unit 22, the food ingredient naturally enters between the material transfer unit 22 and the screw 30 which rotates in the material transfer unit 22 to be crushed and compressed by the screw 30.

Hereinafter, it will be described as an example that the material input unit 21 is asymmetrically connected to the material transfer unit 22, but the present disclosure is not limited thereto, and the material input unit 21 may also be symmetrically provided in the material transfer unit 22.

A base side of the screw 30 is accommodated in the material transfer unit 22. While the food ingredient introduced into the material transfer unit 22 is crushed by the rotating screw 30, the food ingredient is transferred to the front end side of the screw 30 by a crushing blade 32 of the screw 30.

A container coupling unit 25 is provided at a base portion of the material transfer unit 22. The container coupling unit 25 as a component for coupling the container 20 to the body 10 is coupled to the locking member 80 to fix the container 20 to the body 10. Detailed contents thereof will be described below. A shaft through-hole (non-reference numeral) through which the shaft 33 passes is formed in the container coupling unit 25 so that the shaft 33 of the screw 30 protrudes from the container 20 (see FIG. 7).

The cover coupling unit 24 is provided at the front end portion of the material transfer unit 22. The cover coupling unit 24 is a component which couples the cover 60 to the container 20.

Figure 6:
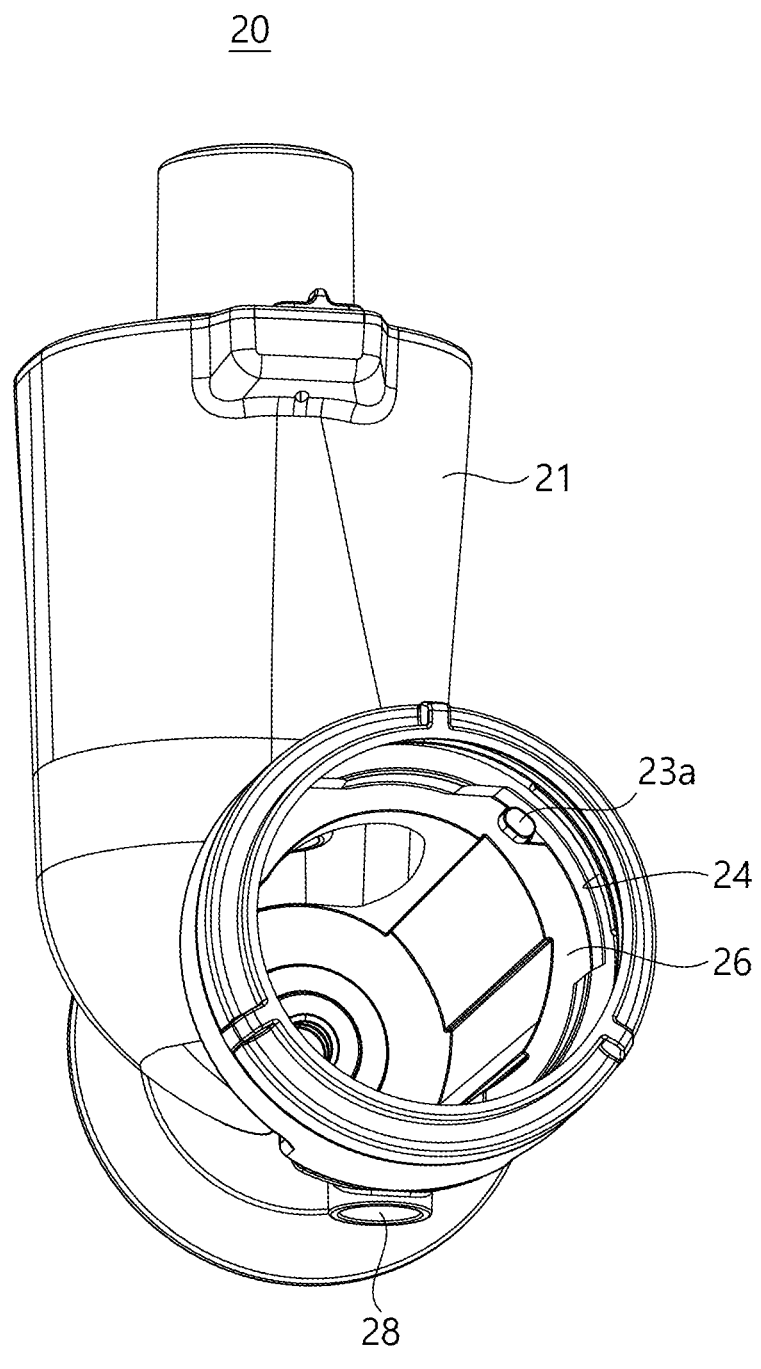
FIG. 6 is a perspective view illustrating a front end side of the food processor according to an embodiment of the present disclosure.

A juice outlet 28 penetrating the material transfer unit 22 downward is formed on the bottom of the material transfer unit 22 (see FIG. 6). The juice outlet 28 is located below a residue discharge prevention piece 41*a* of the juicing filter 40 to be described below while the juicing filter 40 is coupled to the container 20. The juice outlet 28 becomes an exit through which the juice generated by the food processor 1 exists from the food processor 1.

The first safety switch unit 23 includes a first safety switch 23*a* which is in the ON state by the juicing filter 40 while the cover 60 is coupled to the container 20. More specifically, the first safety switch 23*a* may be in the ON state by the juicing filter 40 while the juicing filter 40 and the cover 60 are assembled to the container 20. As illustrated in FIGS. 1 and 2, the first safety switch unit 23 may be configured to extend from the front end side to a rear side of the container 20. Detailed contents thereof will be described below.

The screw 30 includes a screw body 31, a crushing blade 32, the shaft 33, and a front end protrusion 34.

The crushing blade 32 rotates along an outer periphery of the screw body 31, and extends from the base side to the front end side. The crushing blade 32 may be constituted by one or more. A protrusion height of the crushing blade 32 may be lowered from the base side to the front end side, and an overall diameter of the screw 30 may be also formed to be smaller from the base side to the front end side. The reason is that shapes of the juicing filter 40 and the cover 60 to be described below should form a downward slope toward the container 20 so that the juice may naturally flow to the juice outlet 28 side.

Further, the crushing blade 32 is preferable formed to have a higher density at the front end side than the base side. The reason is that the food ingredient is primarily crushed between the screw 30 and the container 20 at the base side of the screw 30, but the food ingredient is primarily juiced between the screw 30 and the juicing filter 40 at the front end side of the screw 30.

The shaft 33 protrudes on the base portion of the screw 30, and as described above, the shaft 33 is inserted into the shaft insertion hole 18 of the body 10 by passing through the container 20 to receive rotary power from the motor 113*b*.

A front end protrusion 34 is formed at a front end of the screw 30. The front end protrusion 34 is in close contact with the juice discharge prevention member 50 located between the cover 60 and the juicing filter 40. A residue compressed by the screw 30 and the juicing filter 40 and discharging the juice is discharged to the outside of the food processor 1 through a space between the front end protrusion 34 and the juice discharge prevention member 50.

As illustrated in FIG. 3, the juicing filter 40 is located between the screw 30 and the cover 60 to discharge the juice generated in a crushing and compressing process of the food ingredient through a side surface. Further, the juice generated in the crushing and compressing processes of the food ingredient may be discharged even to a fine gap between an inner filter 41 and an outer filter 42, and detailed contents thereof will be described below.

That is, the juice is discharged in a radial direction based on a rotary axis of the screw 30. The residue is moved to the front end side of the juicing filter 40 along the screw 30 and discharged to the outside of the juicing filter 40. In FIGS. 2 to 5, as an example of the juicing filter 40, the juicing filter 40 constituted by the inner filter 41 and the outer filter 42 is illustrated.

The inner filter 41 is formed to have a substantially cylindrical shape, and a filter flange 41*c* expanded in an outer direction and the residue discharge prevention piece 41*a* are formed at the base portion, and the screw through-hole 41*f* through which the screw 30 passes is formed at the front end portion.

The residue discharge prevention piece 41*a* prevents a food ingredient by-product (the juice, the residue, a food ingredient fragment, etc.) crushed by the screw 30 before the food ingredient enters the juicing filter 40 from falling to the juice outlet 28, and allows the juice generated in the crushing process to pass and fall to the juice outlet 28. To this end, a plurality of fine hole 41*b* which may filter the food ingredient by-product and pass the juice may be formed at the residue discharge prevention piece 41*a*.

The inner filter 41 has a plurality of first ribs 41*d* connecting the base side and the front end side. A juice discharge slit 41*e* is formed between contiguous first ribs 41*d*.

The outer filter 42 is formed to have a substantially cylindrical shape to accommodate the inner filter 41. The outer filter 42 has juice discharge paths 42a and 42b opened in the radial direction on the side surface. A rib accommodation groove 42d accommodating the first rib 41d of the inner filter 31 and a second rib 42c which protrudes while forming a boundary of the rib accommodation groove 42d is formed on the inner surface of the outer filter 42. The second rib 42c is accommodated in the juice discharge slit 41e of the inner filter 41.

A residue discharge ring 42e accommodating the front end protrusion 34 of the screw 30 and mounted with the juice discharge prevention member 50 is formed at the front end side of the outer filter 42.

The second ribs 42c are accommodated in the juice discharge slit 41e, and the fine gap is formed between the juice discharge slit 41e and the second rib 42c while the outer filter 42 and the inner filter 41 are coupled. The juice generated by juicing the food ingredient between the inner filter 41 and the screw 30 passes through the fine gap, and then passes through the juice discharge paths 42a and 42b, and moves to the container 20 along an inclined inner surface of the cover 60, and is discharged to the outside of the food processor 1 through the juice outlet 28. The residue generated in the process of juicing the food ingredient is not discharged to the fine gap, and is discharged to the outside of the juicing filter 40 through the residue discharge ring 42e along the screw 30 by rotation of the screw 30.

As illustrated in FIG. 4, the juice discharge prevention member 50 is provided between the juicing filter 30 and the cover 60. The juice discharge prevention member 50 is made of an elastic deformation material such as silicon, rubber, etc., and is an approximately ring-shaped member having a front end protrusion accommodation hole 51 formed at the center thereof.

The juice discharge prevention member 50 is in close contact with the front end protrusion 34 of the screw 30 to prevent the juice from being discharged between the front end protrusion 34 and the juicing filter 40.

The cover 60 accommodates the juicing filter 40 and is coupled to the cover coupling unit 24 of the container 20. The cover 60 includes a body 61, a first coupling unit 62, and a second coupling unit 63.

The body 61 is formed to accommodate the juicing filter 40 therein, and the first coupling unit 62 is formed at the base side of the body 61 and the second coupling unit 63 is formed at the front end side of the body 61.

The first coupling unit 62 is formed to have a structure corresponding to the cover coupling unit 24, and couples the cover 60 to the container 20. For example, the first coupling unit 62 is inserted into the inside of the cover coupling unit 24, and then rotate at a predetermined angle and fixed to be coupled to the cover coupling unit 24.

A first residue outlet 64 through which the residue is discharged is formed in the second coupling unit 63. As illustrated in FIG. 4, the front end protrusion 34 of the screw 30 may be located in the first residue outlet 64. An adjustment cap coupling structure 63a is formed so that the adjustment cap 70 is detachably coupled to an exterior of the second coupling unit 63.

As illustrated in FIG. 4, the adjustment cap 70 may be coupled to the cover 60 so as to surround the interior and the exterior of the second coupling unit 63. An interior portion of the adjustment cap 70 inserted into the first residue outlet 64 may support the juice discharge prevention member 50. Since the juice discharge prevention member 50 is supported by the adjustment cap 70, it is possible to prevent a case where the juice discharge prevention member 50 is excessively deformed in a process in which the residue is discharged between the juice discharge prevention member 50 and the front end protrusion 34 and the space between the juice discharge prevention member 50 and the front end protrusion 34 is thus excessively widened.

A second residue outlet 71 disposed approximately coaxially with the first residue outlet 64 is formed at the center of the adjustment cap 70. The residue discharged between the juice discharge prevention member 50 and the front end protrusion 34 is finally discharged from the food processor 1 through the second residue outlet 71.

Meanwhile, the adjustment cap 70 may perform a function of adjusting a discharge speed of the residue. To this end, the adjustment cap 70 may be formed to change a separation distance from the juice discharge prevention member 50 while being coupled to the cover 60.

Specifically, when the adjustment cap 70 rotates in one direction while being coupled to the cover 60, the adjustment cap 70 may be configured to approach in the direction of the juice discharge prevention member 50 and to be spaced apart from the juice discharge prevention member 50 when rotating in an opposite direction.

In this case, a principle of adjusting the discharge speed of the residue by the adjustment cap 70 may be because an elastic deformation degree of the juice discharge prevention member 50 is different in the juicing process according to a breadth and a narrowness of a distance between the adjustment cap 70 and the juice discharge prevention member 50.

More specifically, as the distance between the adjustment cap 70 and the juice discharge prevention member 50 increases, the juice discharge prevention member 50 is supported in contact with the adjustment cap 70 while being further elastically deformed. In this case, the elastic deformation degree of the juice discharge prevention member 50 is larger, a gap between the screw 30 and the juice discharge prevention member 50 increases. Further, when the gap between the screw 30 and the juice discharge prevention member 50 increases, the quantity of residues which may be discharged through the juice discharge prevention member 50 at once increases, and as a result, the discharge speed of the residue increases.

Hereinafter, the first safety switch unit will be described in detail.

Figure 7:
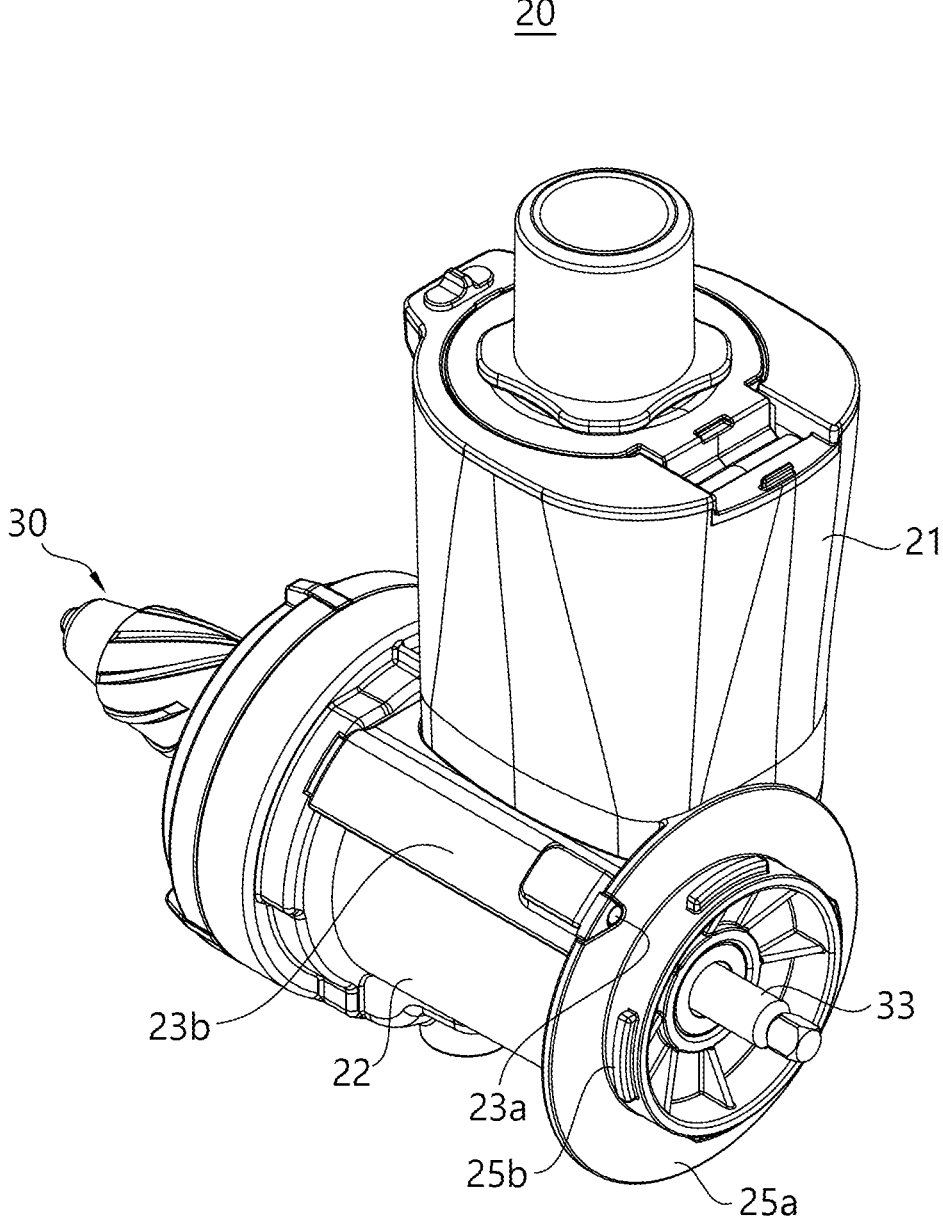
FIG. 7 is a perspective view illustrating a front end side of the container in a state to which the screw of the food processor is assembled according to an embodiment of the present disclosure.
Figure 8:
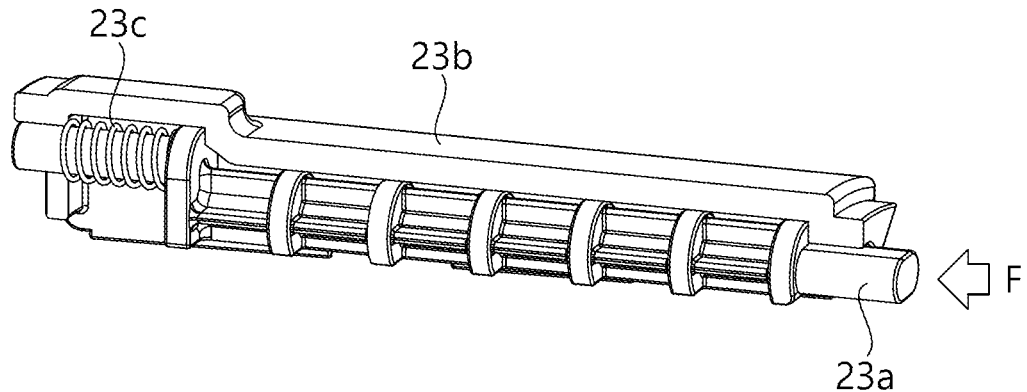
FIG. 8 is a perspective view illustrating a first safety switch unit of the food processor according to an embodiment of the present disclosure.

FIG. 6 is a perspective view illustrating a front end side of the food processor according to an embodiment of the present disclosure, FIG. 7 is a perspective view illustrating a front end side of the container in a state to which the screw of the food processor is assembled according to an embodiment of the present disclosure, and FIG. 8 is a perspective view illustrating a first safety switch unit of the food processor according to an embodiment of the present disclosure.

The first safety switch unit 23 includes a first safety switch 23a. As illustrated in FIGS. 6 and 7, the first safety switch 23a is provided so that both ends are exposed to a front end and a rear end of the container 20, respectively.

Referring to FIG. 6, the cover coupling 24 is formed at the front end portion of the container 20, and a filter support unit 26 which is in contact with the juicing filter 40 is formed at the base side rather than the cover coupling unit 24 adjacent to the cover coupling unit 24. The filter support unit 26 is in contact with the filter flange 41c of the inner filter 41.

As illustrated in FIG. 6, the first safety switch 23a is provided to retract so that the front end protrudes toward the front end side from the filter support unit 26.

Referring to FIG. 7, a container flange 25*a* expanded in the outer direction from the material transfer unit 22 and a first coupling end 25*b* formed at the base side rather than the container flange 25*a* are formed at the base portion of the container 20.

As illustrated in FIG. 7, the first safety switch 23*a* is provided to retract so that the rear end protrudes by penetrating the container flange 25*a*.

As illustrated in FIG. 8, the first safety switch unit 23 includes the first safety switch 23*a*, a switch housing 23*b*, and a first elastic member 23*c*.

The first safety switch 23*a* is disposed on the side surface of the material transfer unit 22, and the switch housing 23*b* accommodates the first safety switch 23*a* and the first elastic member 23*c* therein.

The first safety switch 23*a* is supported in a switch housing 23*b* so as to be movable within a predetermined range, and a first elastic member 23*c* elastically supports the first safety switch 23*a* in the switch housing 23*b*. As illustrated in FIG. 8, the first elastic member 23*c* provides elastic force so that the front end of the first safety switch 23*a* protrudes from the switch housing 23*b*. The first safety switch 23*a* may move to the base side by external force (F; see FIG. 8), and when the first safety switch 23*a* moves to the base side, the base of the first safety switch 23*a* starts to protrude to the housing, and positional energy by the elastic force is stored in the first elastic member 23*c*. When the external force is removed, the first elastic member 23*c* moves the first safety switch 23*a* to the front end side based on the elastic force. Hereinafter, an operation of the first safety switch unit 23 will be described.

Figure 9:
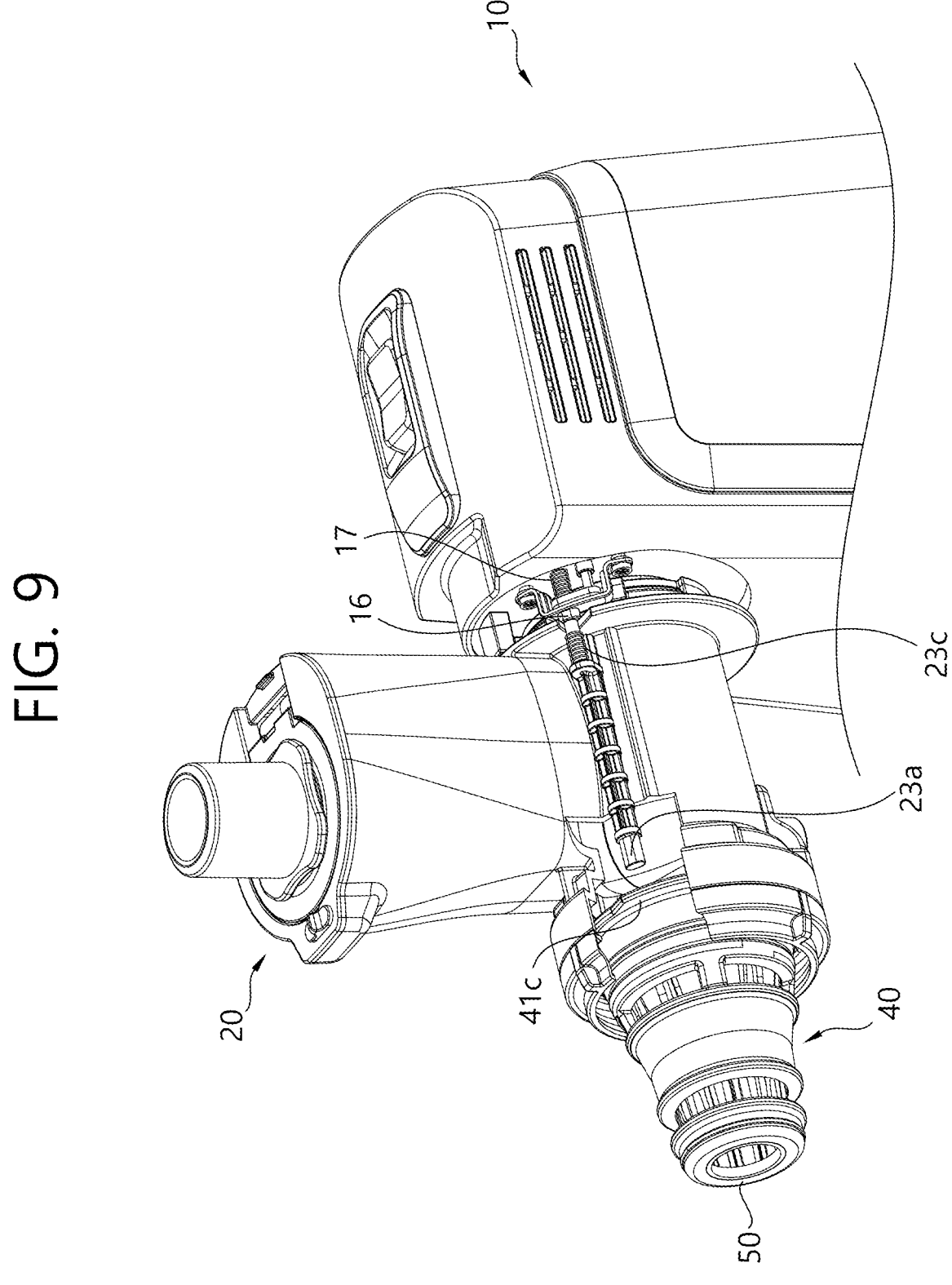
FIG. 9 is a diagram expressing a state in which the juicing filter is not closely attached, but separated from the container of the food processor according to an embodiment of the present disclosure.
Figure 10:
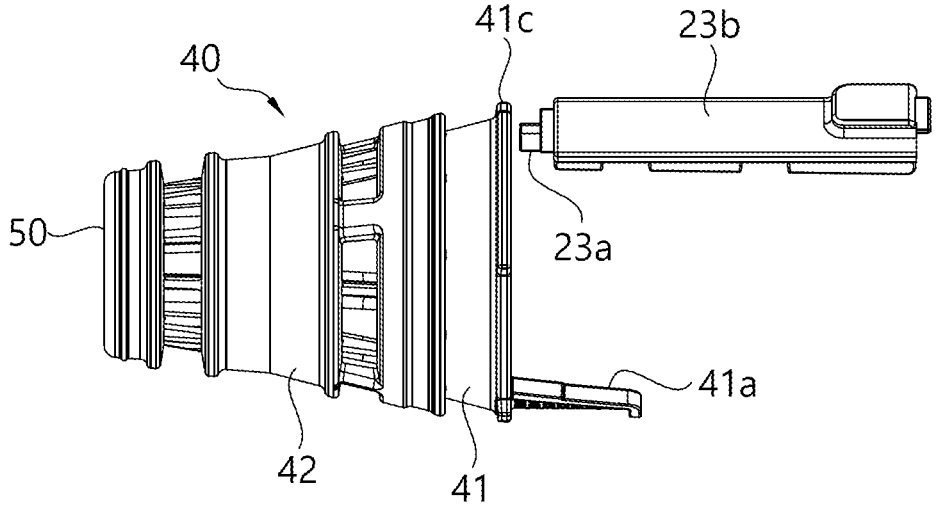
FIG. 10 is a diagram for describing an OFF state of the first safety switch of the food processor according to an embodiment of the present disclosure.
Figure 11:
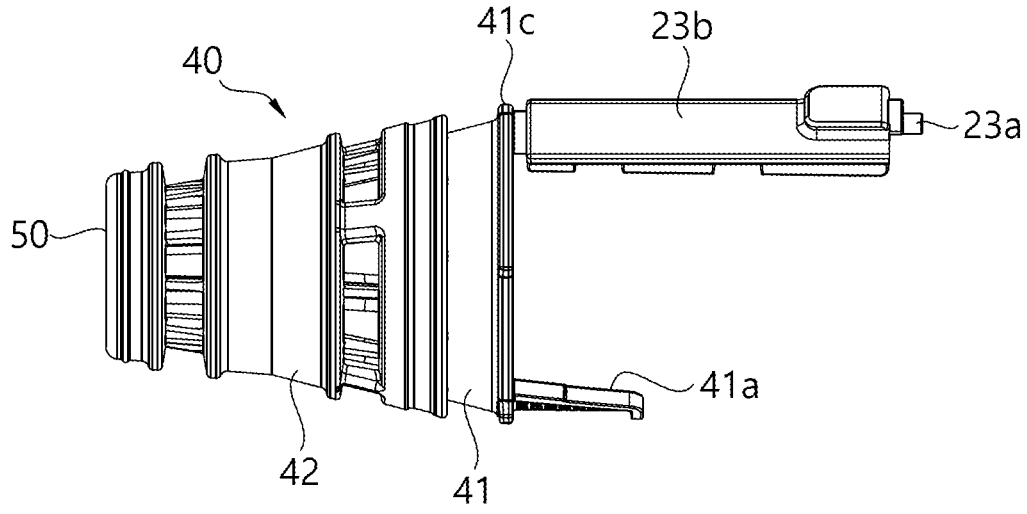
FIGS. 11 and 12 are diagrams for describing an ON state of the first safety switch of the food processor according to an embodiment of the present disclosure.
Figure 12:
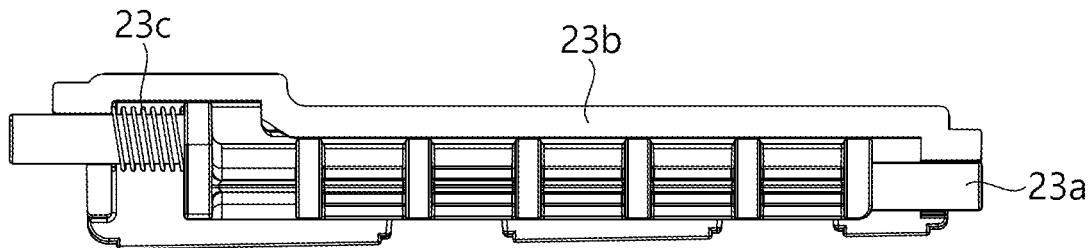
Figure 13:
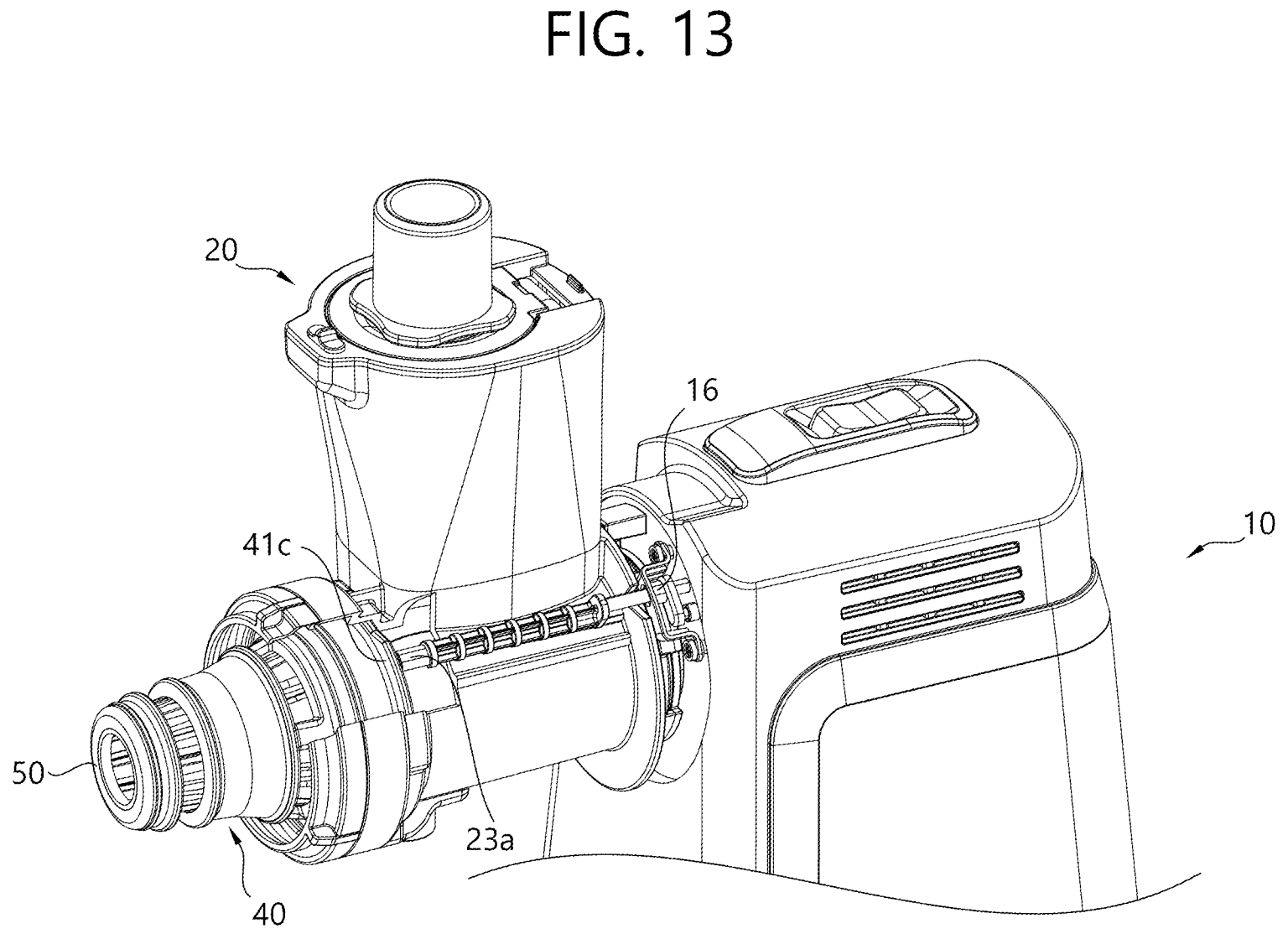

FIGS. 9 and 10 are diagrams for describing an OFF state of the first safety switch of the food processor according to an embodiment of the present disclosure and FIGS. 11 to 13 are diagrams for describing an ON state of the first safety switch of the food processor according to an embodiment of the present disclosure.

The first safety switch 23*a* operates in an OFF state and an ON state.

FIGS. 6 to 10 are diagrams illustrating a state in which the first safety switch 23*a* is OFF.

When the external force is not applied to the first safety switch 23*a*, the first safety switch 23*a* is located in the OFF state.

In the OFF state, as illustrated in FIG. 6, the first safety switch 23*a* may be located to protrude toward the front end side from the filter support unit 26 and as illustrated in FIG. 7, the first safety switch 23*a* may be located not to protrude from the container flange 25*a*.

Further, as illustrated in FIG. 8, the front end of the first safety switch 23*a* may be located so that the front end protrudes from the switch housing 23*b* and the base does not protrude from the switch housing 23*b*.

As illustrated in FIGS. 9 and 10, since the first safety switch 23*a* is not pressed by the filter flange 41*c* while the juicing filter 40 is not yet in close contact with the container 20.

Referring to FIG. 9, a second safety switch 16 elastically supported by a second elastic member 17 is provided in the body 10. Specifically, the second safety switch 16 may be a switch of which ON/OFF state is determined in link with the first safety switch 23*a*.

The second safety switch 16 may be provided as various configurations of changing the ON/OFF state by identifying a state change of the first safety switch 23*a*. For example, the second safety switch 16 as a switch of which ON/OFF is switched through a mechanical structural change may be provided to be pressed by the first safety switch 23*c* and switched to be the ON state, provided so that the ON/OFF state is switched based on a magnetic force change as the first safety switch 23*a* includes a magnetic body, or configured to recognize a case where the first switch 15 is in the ON state by using infrared rays.

Hereinafter, it is assumed and described that the second safety switch 16 mechanically interlocks with the first safety switch 23*a* and the ON/OFF state of the second safety switch is switched, but the present disclosure is not limited thereto.

As an example in which the second safety switch 16 mechanically interlocks with the first safety switch 23*a* and the ON/OFF state is switched, the second safety switch 16 may be configured to be aligned with the base of the first safety switch 23*a* in line while the container 20 is coupled to the body 10.

The second safety switch 16 is a switch which is in the ON state only when the second safety switch 16 is pressed to the inside of the body 10 to a predetermined depth or more, and the control unit 90 is configured to operate the motor 113*b* only when the second safety switch 16 is in the ON state. Therefore, even though a user manipulates the power switch 115 as the ON state, the motor 113*b* does not operate when the second safety switch 16 in the OFF state.

Specifically, when the second safety switch 16 is in the OFF state, the first safety switch 23*a* does not press the second safety switch 16 or prevents the second safety switch 16 into the body 10 with the predetermined depth in spite of pressurizing the second safety switch 16 so that the second safety switch 16 is not switched to the ON state.

Meanwhile, when the juicing filter 40 is coupled to the container 20 and the filter flange 41*c* is thus in close contact with the filter support unit 26, the filter flanged 41*c* presses the first safety switch 23*a* to move the first safety switch 23*a* to the base side and the first safety switch 23*a* is switched to the ON state, as illustrated in FIG. 11.

The juicing filter 40 is configured to be in close contact with the filter support unit 26 while the cover 60 is fully coupled to the container 20 and the first safety switch 23*a* may be configured to be switched to the ON state only when the cover 60 is coupled to the container 20.

When the first safety switch 23*a* moves to the base side and the first safety switch 23*a* is thus switched to the ON state, the base of the first safety switch 23*a* protrudes from the switch housing 23*b* as illustrated in FIG. 12. In addition, as illustrated in FIG. 13, the base of the first safety switch 23*a* protrudes to the base side from the container flange 25*a* to press the second safety switch 16 and switch the second safety switch 16 to the ON state.

That is, the food processor 1 according to an embodiment of the present disclosure allows the second safety switch 16 to be in the ON state only while the juicing filter 40 (or the juicing filter 40 and the cover 60) covering the screw 30 is coupled to the container 20 and the motor operates to prevent the screw 30 from rotating while the screw 30 is exposed to the outside.

That is, in the food processor 1 according to an embodiment of the present disclosure, since the second safety switch 16 is not switched to the ON state even though the container 20 and the screw 30 are coupled to the body 10 while the juicing filter 40 covering the screw 30 is not assembled, the rotation of the screw 30 is prevented even though the user turns on the power switch 115 by mistake while assembling only the container 20 and/or the screw 30 to the body 10, thereby preventing a safety accident.

Hereinafter, the locking member 80 will be described in detail.

Figure 14:
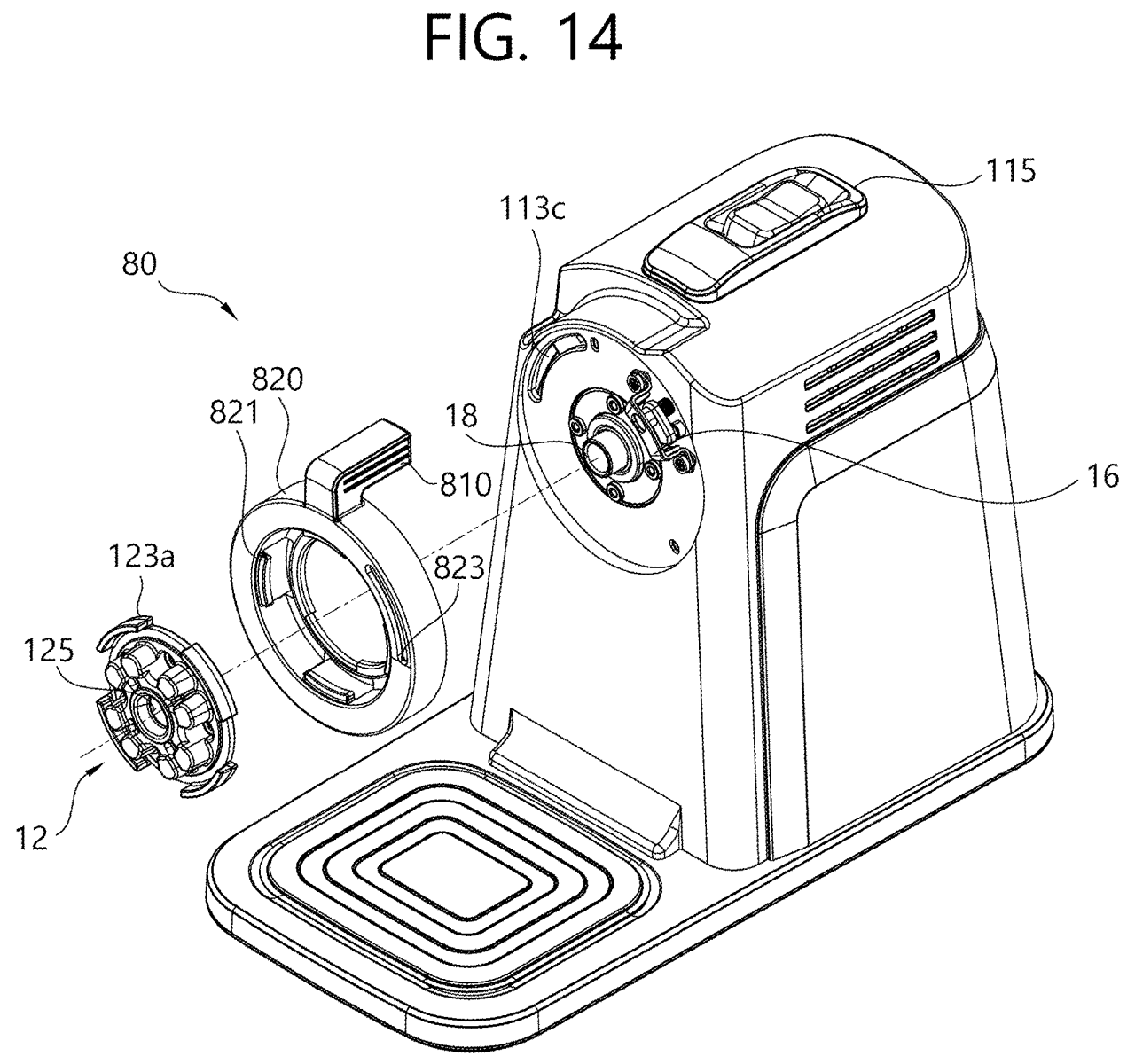
Figure 15:
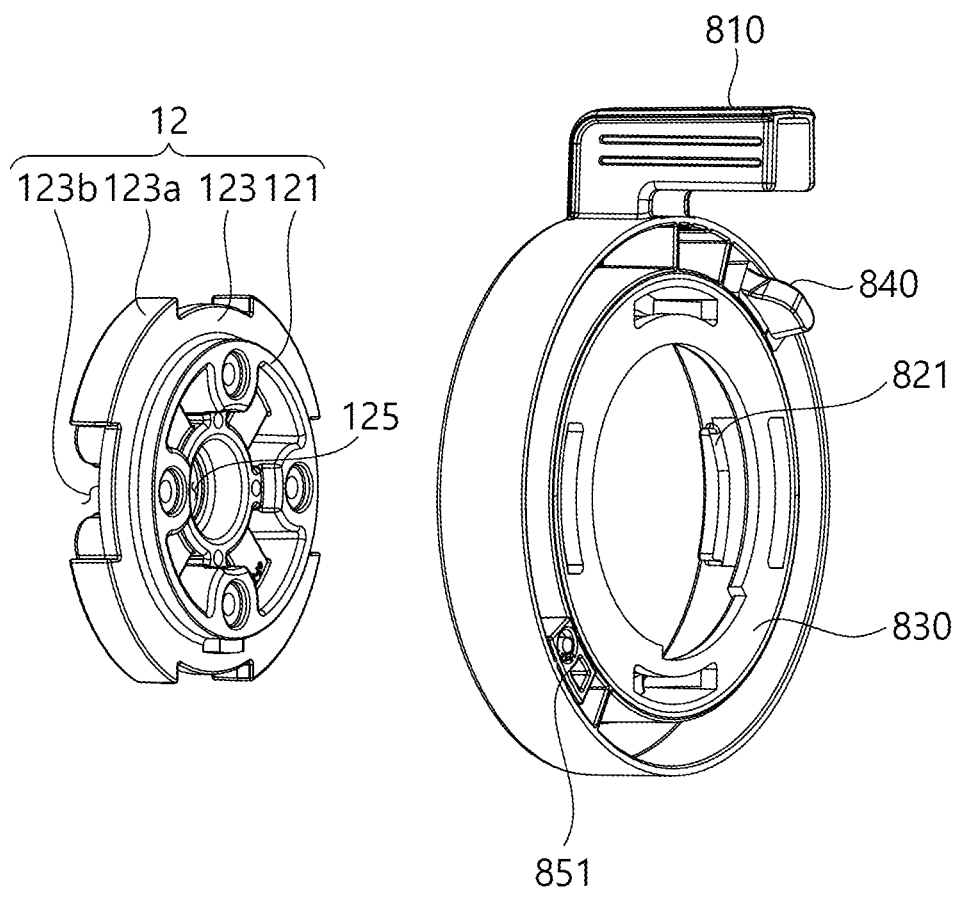
FIG. 15 is a diagram for describing a coupling relationship between the locking member and the anti-separation member of the food processor according to an embodiment of the present disclosure.
Figure 16:
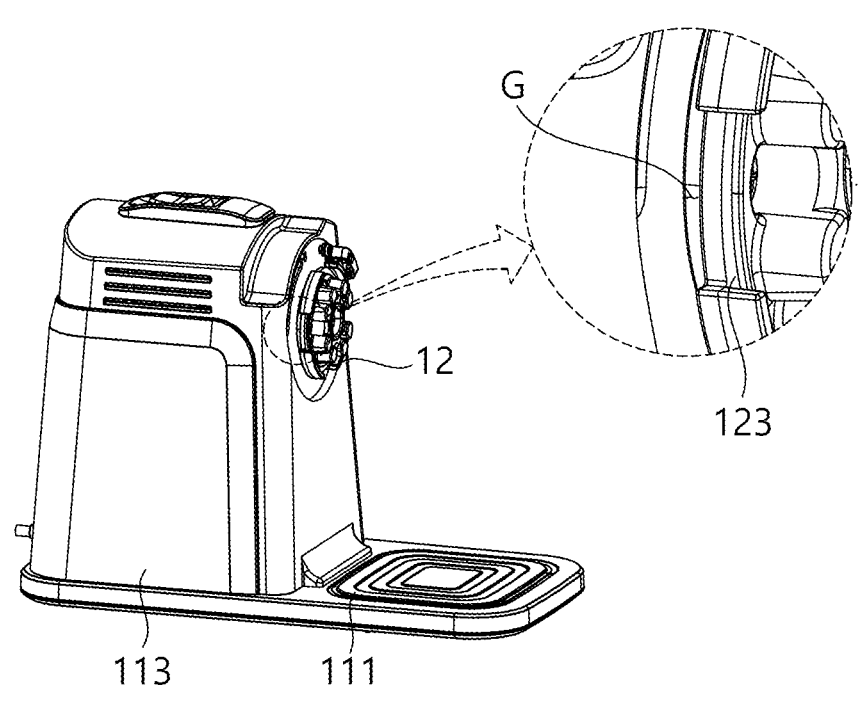
FIG. 16 is a diagram illustrating a state in which the anti-separation member and a housing of the food processor are coupled according to an embodiment of the present disclosure.
Figure 17:
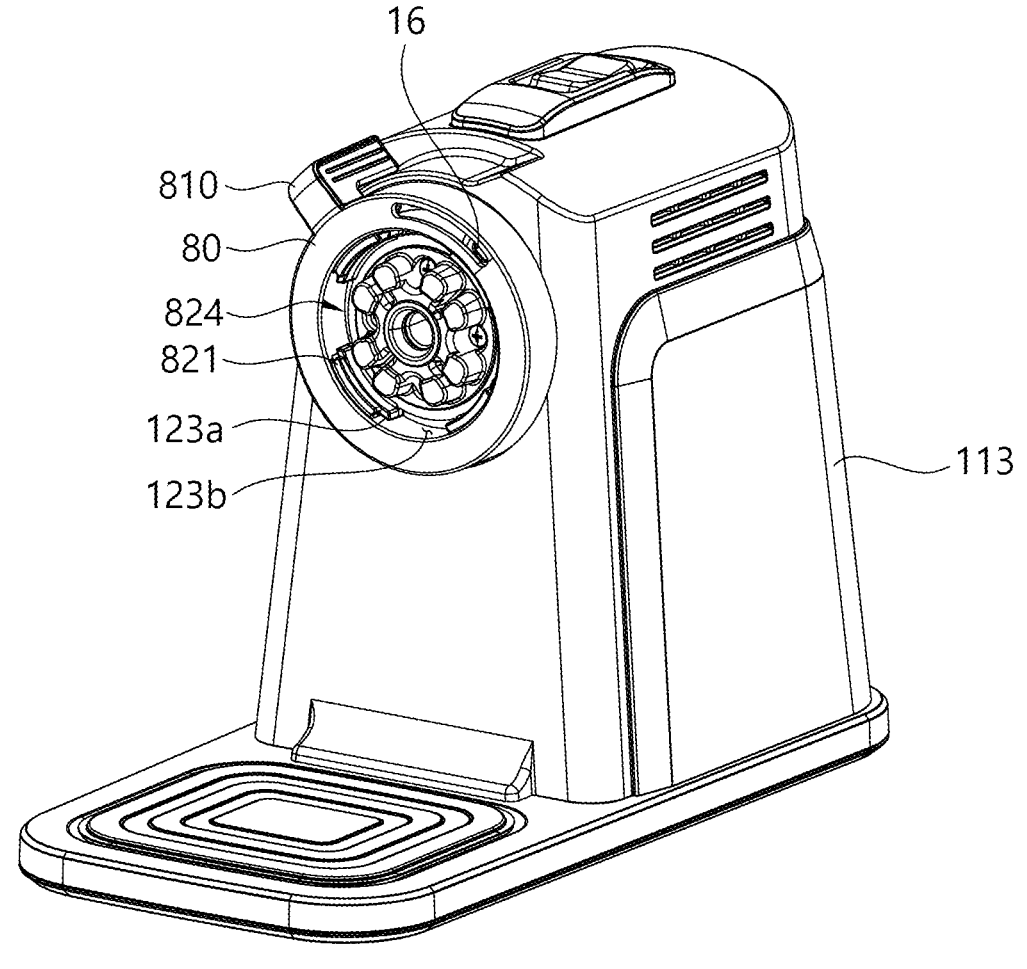
FIG. 17 is a perspective view illustrating a state in which the locking member of the food processor is located at a first position according to an embodiment of the present disclosure.
Figure 18:
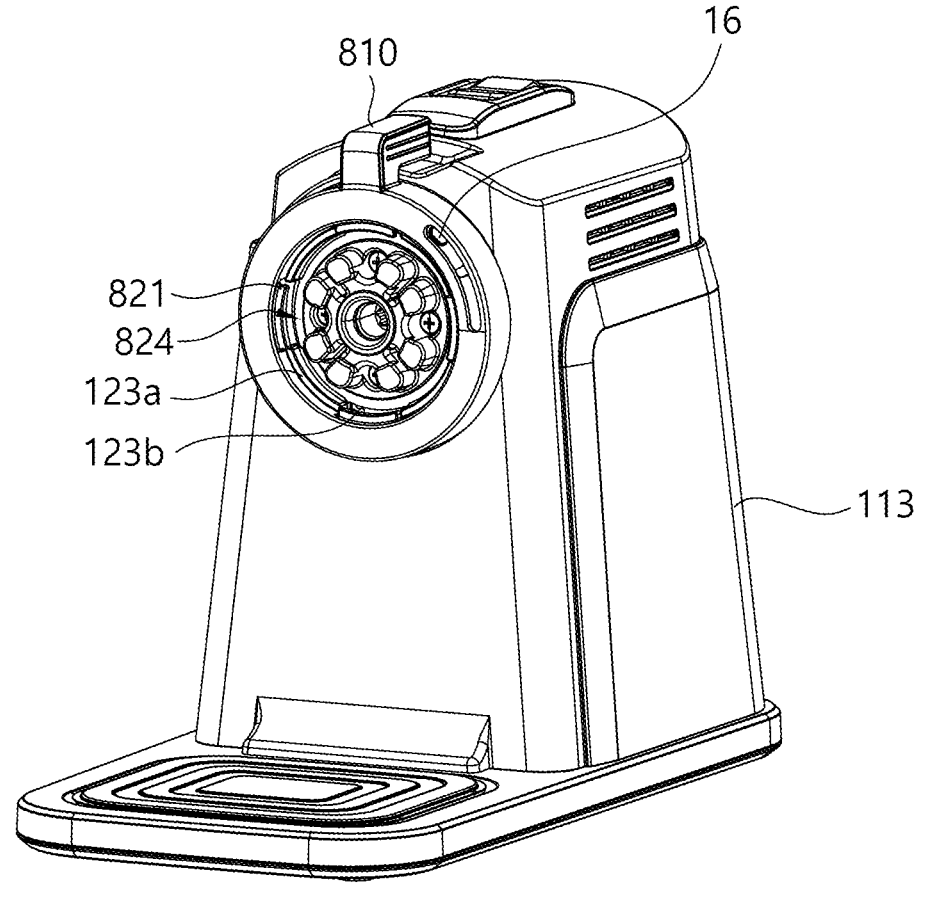
FIG. 18 is a perspective view illustrating a state in which the locking member of the food processor is located at a second position according to an embodiment of the present disclosure.

FIG. 14 is an exploded perspective view illustrating a power transmission unit, a locking member, and an anti-separation member of the food processor according to an embodiment of the present disclosure. FIG. 15 is a diagram for describing a coupling relationship between the locking member and the anti-separation member of the food processor according to an embodiment of the present disclosure. FIG. 16 is a diagram illustrating a state in which the anti-separation member and a housing of the food processor are coupled according to an embodiment of the present disclosure. FIG. 17 is a perspective view illustrating a state in which the locking member of the food processor is located at a first position according to an embodiment of the present disclosure. FIG. 18 is a perspective view illustrating a state in which the locking member of the food processor is located at a second position according to an embodiment of the present disclosure.

As illustrated in FIG. 14, the locking member 80 is interposed between a housing 113 of the power transmission unit 11 and the anti-separation member 12 and coupled to the body 10.

Specifically, as illustrated in FIG. 15, the locking member 80 includes a rotation ring 820 having a substantially ring shape that is centered on the shaft insertion hole 18, a handle 810 which protrudes upward from the rotation ring 820, and an inner flange 830 which protrudes in a central direction of the rotation ring 820 on an inner wall of the rotation ring 820.

The interior of the rotation ring 820 and the front end of the anti-separation member 12 form an accommodation space 824 accommodating the base side of the container 20. A second coupling end 821 which protrudes toward the accommodation space 824 is formed on the inner surface of the rotation ring 820, and a switch slit 823 having an arc shape, which moves along the rotation ring 820 is formed on one surface of the rotation ring 820 so that the second safety switch 16 maintains a state of being exposed to the outside in spite of the rotation of the locking member 80.

Meanwhile, the anti-separation member 12 may be configured to include a protrusion portion 121 having a substantially ring shape that is centered on a through-hole 125 to be described below, and a fixation flange 123 extended to the outside from the side surface of the protrusion portion 121.

In this case, the through-hole 125 aligned with the shaft insertion hole 18 may be formed in the protrusion portion 121 so that the base of the shaft 33 is capable of entering the shaft insertion hole 18 while the protrusion portion 121 is coupled to the housing 13.

Further, the protrusion portion 121 is accommodated in the locking member 80 and coupled to the 113 by passing through a space between inner flanges 830. Referring to FIG. 16, more specifically, as illustrated in FIG. 16, the fixation flange 123 forms a gap G into which the inner flange 830 is inserted while being coupled to the housing 113. The locking member 80 is prevented to be separated from the body 10 by inserting at least a part of the inner flange 830 into the gap G.

Meanwhile, while the inner flange 830 is inserted into the gap G, an end portion of the inner flange 830 is in contact with the protrusion portion 121. As a result, the inner flange 830 rotates along an outline of the protrusion portion 121 when the locking member 80 moves between a first position and a second position.

Further, the protrusion portion 121 may be fixed to the housing 113 so as not to rotate jointly with the shaft 33. For example, the protrusion portion 121 may be fastened or fixed to the housing 113 by using a fastening member such as a screw, a bolt, a rivet, etc., attached and fixed to the housing 113 by using an adhesive, etc., or have a shape of being assemblable to the housing 113 to be assembled and fixed to the housing 113.

Further, a coupling portion (non-reference numeral) which is matched with the base of the container 20 may be formed on a front surface of the protrusion portion 121. For example, the coupling portion forms a female-male structure with the base of the container 20 to prevent the container 20 from rotating while being coupled. More specifically, the protrusion portion 121 may have a shape of engaging with the base of the container 20. For example, the coupling portion may be formed to have a protruding portion inserted into a groove formed at the base of the container 20 or have a groove into which a portion protruding from the base of the container 20 is inserted.

A support end 123*a* and a coupling end accommodation groove 123*b* are formed in the fixation flange 123. Specifically, a plurality of support ends 123*a* protrudes on the fixation flange 123 in the direction of the front end of the anti-separation member 12. When the protrusion portion 121 is inserted into the inner flange 830 and the anti-separation member 12 is accommodated in the rotation ring 820, the support end 13*a* is located at a location adjacent to the power transmission unit 11 rather than the second coupling end 821 while being adjacent to the second coupling end 821.

The coupling end accommodation groove 123*b* is formed between the adjacent support ends 123*a*. The coupling end accommodation groove 123*b* is a space accommodating a first coupling end 25*b* formed at the base portion of the container 20, and the support end 123*a* supports both sides of the first coupling end 25*b* accommodated in the coupling end accommodation groove 123*b* to prevent the container 20 from rotating.

As illustrated in FIG. 17, when the locking member 14 is located at the first position, the second coupling end 821 is aligned with the support end 123*a* in line. In addition, the coupling end accommodation groove 123*b* is located to cross the second coupling end 821.

Accordingly, when the locking member 80 is located at the first position, the first coupling end 25*b* of the container 20 may enter the coupling end accommodation groove 123*b* in a straight-line direction for coupling the container 20 and the body 10 or the first coupling end 25*b* of the container 20 may be separated from the coupling end accommodation space 123*b* in the straight-line direction for separating the container 20 and the body 10. The straight-line direction coincides with the direction in which the screw 30 enters the shaft insertion hole 18.

As illustrated in FIG. 18, when the locking member 80 is located at the second position, the second coupling end 821 is located to be aligned with the coupling end accommodation groove 123*b* in line and to cross the support end 123*a*.

Therefore, when the locking member 80 is switched from the first position to the second position while the first coupling end 25*b* is located within the coupling end accommodation groove 123*b*, the second coupling end 821 moves to the front of the coupling end accommodation groove 123*b*, presses the first coupling end 25*b*, and while the locking member 80 is located at the second position, the container 20 is prevented from being separated from the body 10.

By the above-described configuration, the food processor 1 according to an embodiment of the present disclosure may couple the container 20 to the body 10 more easily than the conventional food processor in which the container is coupled to the body while rotating at a predetermined angle in the process of coupling the container to the body.

That is, in the food processor 1 according to an embodiment of the present disclosure, when the container 20 is to be coupled to the body 10, the locking member 80 is located at the first position, the container is moved only in the straight-line direction so that the first coupling end 25*b* of the container 20 is located within the coupling end accommodation groove 123*b*, and then the locking member 80 is just switched from the first position to the second position by rotating the handle 810 to complete the coupling of the container 20. On the contrary, when the container 20 is to be separated from the body 10, the user switches the locking member 80 from the second position to the first position with the container 20, and moves the container 20 only in the straight-line direction to separate the container 20 from the body 10.

In the food processor 1 according to an embodiment of the present disclosure, when the container is to be coupled to the body 10 or separated from the body 10, an operation of rotating the container 20 may be omitted, and as a result, it is possible to couple the container 20 to the body 10 or separate the container 20 from the body 10 more conveniently and with less power.

Hereinafter, the lock safety switch 15 will be described in detail.

Figure 19:
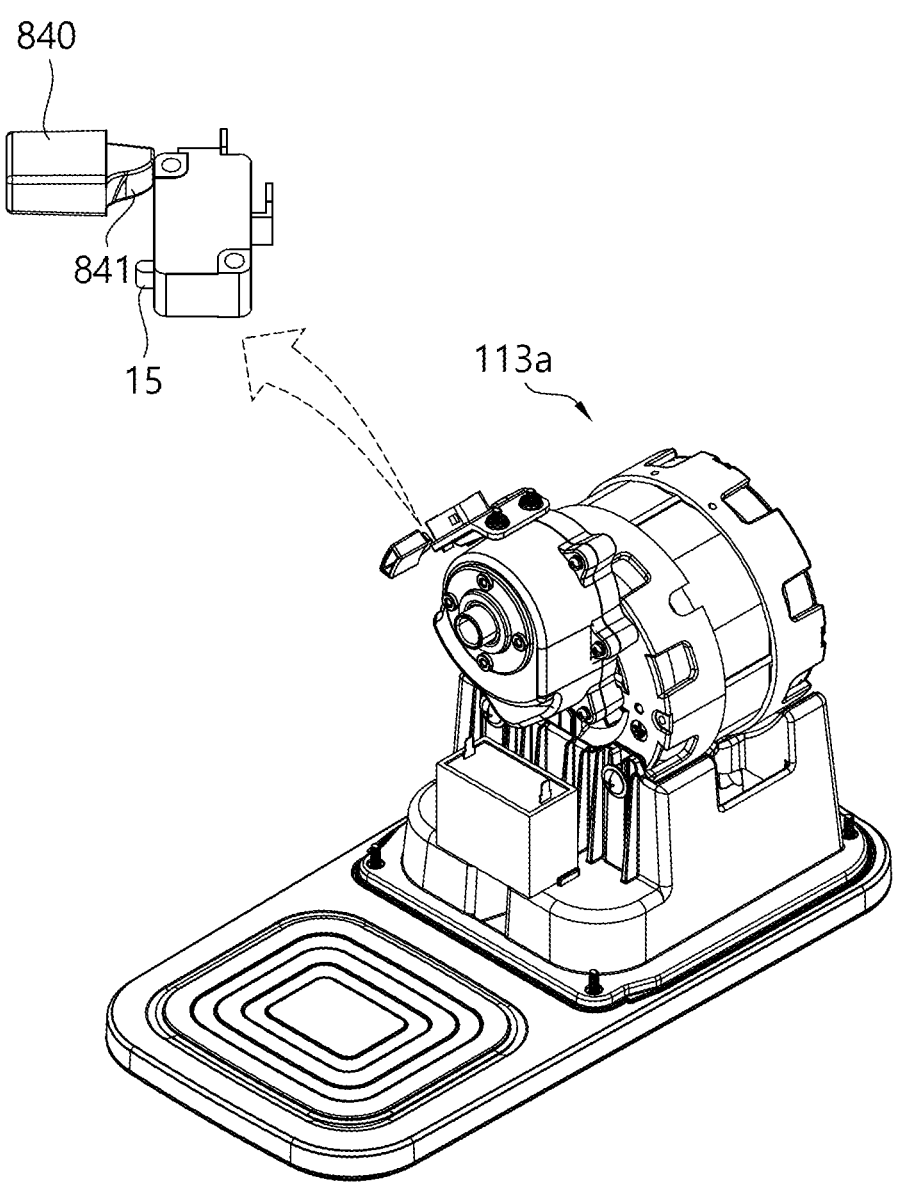
FIG. 19 is a diagram for describing the OFF state of the lock safety switch of the food processor according to an embodiment of the present disclosure.
Figure 20:
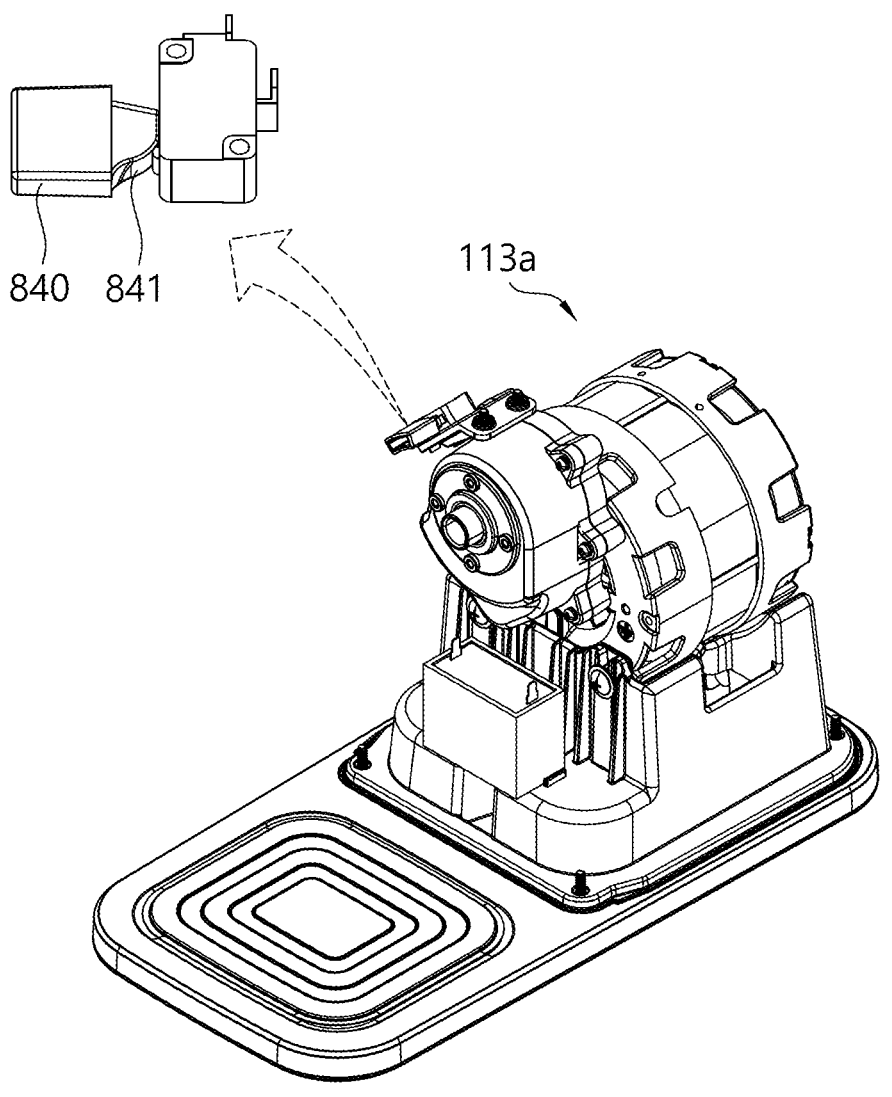
FIG. 20 is a diagram for describing the OFF state of the lock safety switch of the food processor according to an embodiment of the present disclosure.

FIG. 19 is a diagram for describing the OFF state of the lock safety switch of the food processor according to an embodiment of the present disclosure. FIG. 20 is a diagram for describing the ON state of the lock safety switch of the food processor according to an embodiment of the present disclosure.

As illustrated in FIGS. 19 and 20, the lock safety switch 15 is provided inside the housing 113 of the body 10. In order to help understanding, the state of the body 10 illustrated in FIGS. 19 and 20 is a state of the power transmission unit 11 from which the housing 113 is removed. As illustrated in FIGS. 19 and 20, the power transmission unit 11 may further include a motor housing 113*a* disposed inside the housing 113 and in which the motor 113*b* is installed.

The lock safety switch 15 may be provided to retract with respect to the motor housing 113*a* at one side of the motor housing 113*a*. In this case, an elastic member elastically supporting the lock safety switch 15 may be disposed in the motor housing 113*a* so as to maintain the state in which the lock safety switch 15 protrudes.

Meanwhile, the lock safety switch 15 is connected to a control circuit of the motor 113*b* so that the motor 113*b* operates only when the locking safety switch 15 is in the ON state. Through this, the control unit 90 controls the motor 113*b* to operate only when the locking safety switch 15 is in the ON state.

For example, a state in which at least a part of the lock safety switch 15 protrudes on the motor housing 113*a* may become the OFF state and a state in which at least a part is inserted into the motor housing 113*a* may become the ON state.

In this case, the locking member 80 may further include a pressing member 840 that presses the lock safety switch 15 to be inserted into the motor housing 113*a* so as to switch the lock safety switch 15 from the OFF state to the ON state. The pressing member 840 may rotate integrally with the locking member 80 while being inserted into a pressing member accommodation groove (non-reference numeral) formed on a rear surface of the locking member 80 (see FIG. 21).

More specifically, the pressing member 840 is located at a position separated from the lock safety switch 15 at the first position of the locking member 80. In this case, the lock safety switch 15 maintains the state of protruding by the elastic member and the lock safety switch 15 is maintained in the OFF state.

Meanwhile, when the user rotates the locking member 80 in order to switch the locking member 80 to the second position, the pressing member 840 approaches the lock safety switch 15 while rotating jointly with the locking member 80. Thereafter, when the locking member 80 is located at the second position, the pressing member 840 inserts the lock safety switch 15 into the motor housing 113*a* to a predetermined depth or more to allow the lock safety switch 15 to be in the ON state, as illustrated in FIG. 20.

Meanwhile, in this case, the lock safety switch 15 and/or the pressing member 840 may have an inclined surface on one surface so that ON/OFF switching of the lock safety switch 15 may be smooth. For example, the pressing member 840 may have an inclined surface 841 adjacent to the motor housing 113*a* so that one end is separated from the lock safety switch 15. Further, in this case, a shape of the lock safety switch 15 may also be formed to form a predetermined inclination or have a curvature.

Referring to FIG. 14, a guide slot 113*c* moving into which the pressing member 840 is inserted is formed in the housing 113 so that the lock safety switch 15 inside the housing 113 may be pressed by the pressing member 840. When the locking member 80 moves between the first position and the second position, the pressing member 840 rotates in the guide slot 113*c*, and is separated from the lock safety switch 15 or approaches and presses the lock safety switch 15.

Hereinafter, a sound generation unit that generates a sound when the locking member is switched from the first position to the second position will be described in detail.

Figure 21:
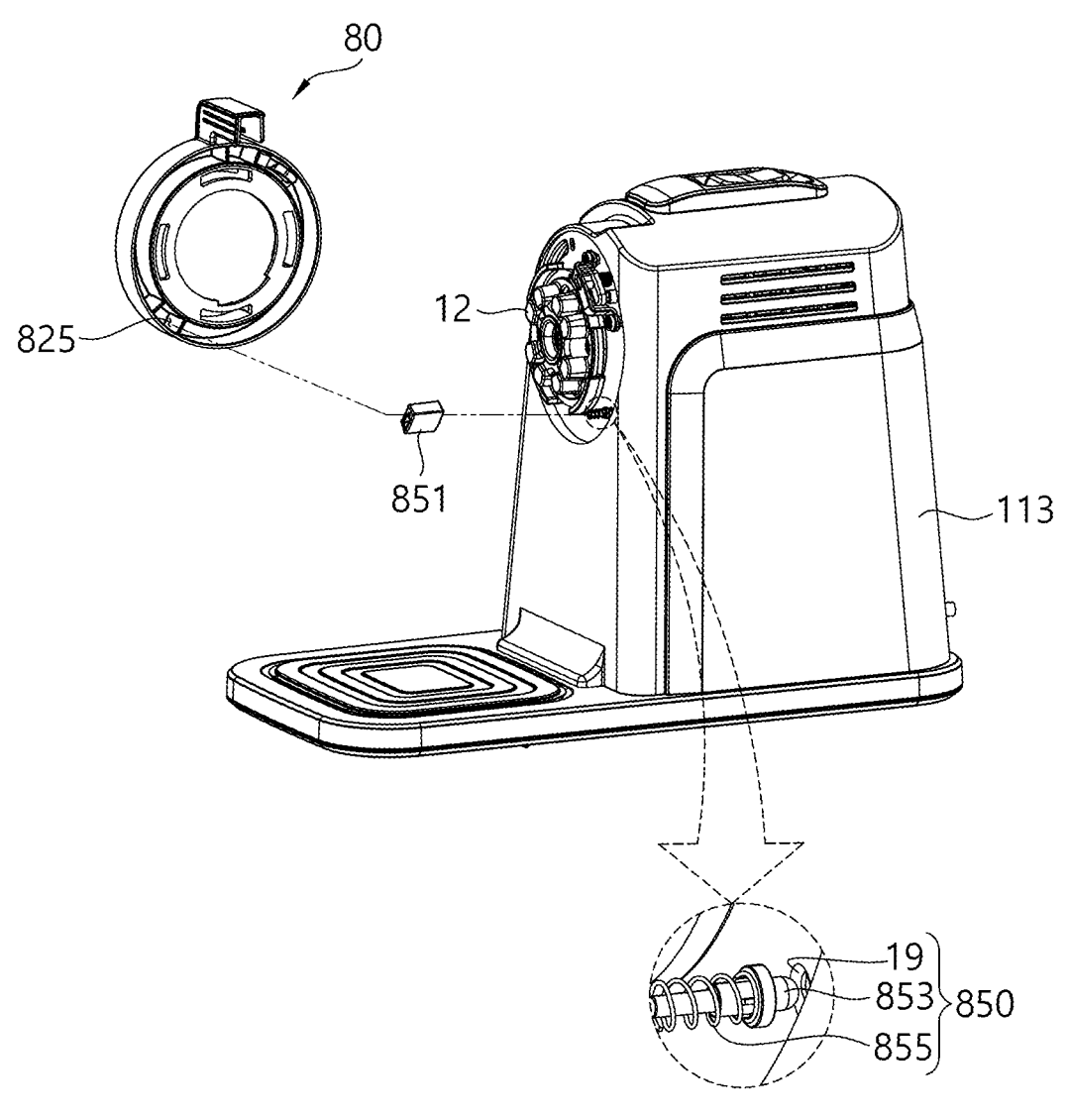
FIG. 21 is a diagram for describing a sound generation unit in the state in which the locking member of the food processor is located at the second position according to an embodiment of the present disclosure.
Figure 22:
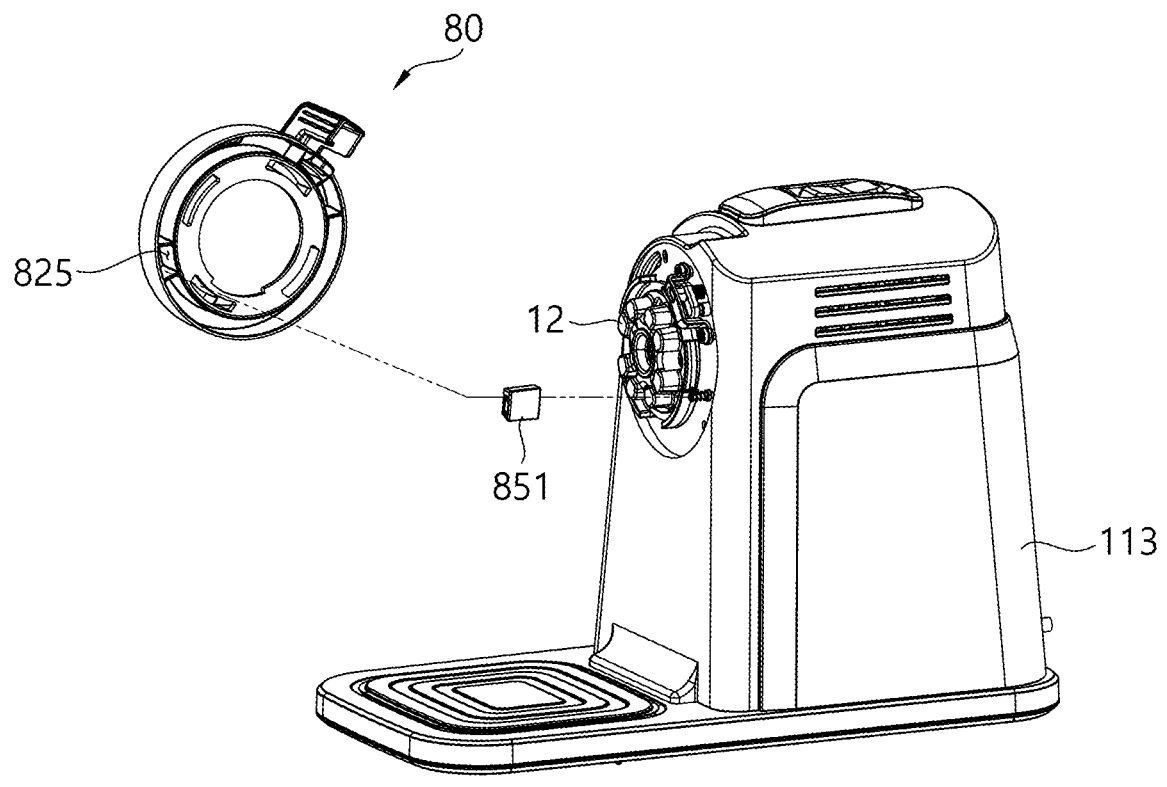
FIG. 22 is a diagram for describing the sound generation unit in the state in which the locking member of the food processor is located at the first position according to an embodiment of the present disclosure.

FIG. 21 is a diagram for describing a sound generation unit in the state in which the locking member of the food processor is located at the second position according to an embodiment of the present disclosure and FIG. 22 is a diagram for describing the sound generation unit in the state in which the locking member of the food processor is located at the first position according to an embodiment of the present disclosure.

Referring to FIG. 21, the sound generation unit 850 includes a hitting portion 853, a third elastic member 855, and a hit portion 19.

The locking member 80 may include a hitting portion housing 851 accommodating the hitting portion 853 and the third elastic member 855, and a housing accommodation groove 825 accommodating the hitting portion housing 851 may be formed at the base side of the rotation ring 820 of the locking member 80.

Therefore, the hitting portion 853 and the third elastic member 855 move jointly with the locking member 80 when the locking member 80 moves between the first position and the second position.

The hit portion 19 may be formed in the body 10. The hit portion 19 may be formed to correspond to the position of the hitting portion 853 when the locking member 80 is located at the second position, and the hit portion 19 is dented further than a surrounding portion.

When the locking member 80 is located at the first position, the hitting portion 853 is supported while the positional energy by the elastic force is stored in the third elastic member 855. Further, when the locking member 80 is located at the first position, the hitting portion 853 is located at a position separated from the hit portion 19.

Thereafter, when the locking member 80 rotates for switching to the second position, the hitting portion 853 rotates jointly with the locking member 80 and moves in the direction of the hit portion 853.

When the locking member 80 is switched from the first position to the second position and the hitting portion 853 is located in the front of the hit portion 19, the third elastic member 855 pushes the hitting portion 853 to the hit portion 19, and the hitting portion 853 and the hit portion 19 collide to generate the sound. The user hears the sound generated while the hitting portion 853 and the hit portion 19 collide and recognized that the locking member 80 is completely located at the second position.

The hitting portion 853 and the hit portion 19 may be made of a metallic material so that the sound generated by the collision of the hitting portion 853 and the hit portion 19 may become a clear bell sound.

In FIGS. 21 and 22, an example in which the hitting portion 853 is formed in the locking member 80 and the hit portion 19 is formed in the body is illustrated, but in some embodiments, the hitting portion 853 may be formed in the body 10 and the hit portion 19 may be formed in the locking member 80.

Alternatively, in FIGS. 21 and 22, an example in which the sound is configured to be generated while the locking member 80 is located at the second position by a mechanical method is illustrated, but the sound may also be configured to be generated by an electronic method by recognizing that the locking member 80 is located at the second position.

Hereinafter, embodiments according to a case where the lock safety switch of the present disclosure is configured differently from the above-described embodiment will be described, and a description of the same or similar component will be omitted in order to avoid a duplicate description.

Meanwhile, in the above-described embodiment, it is described that the state in which the lock safety switch 15 protrudes is the OFF state and the state in which the lock safety switch 15 is inserted is the ON state, but the present disclosure is not limited thereto.

For example, in the food processor according to another embodiment of the present disclosure, the lock safety switch 15 may also be provided to become in the ON state in the state of protruding to the outside of the housing 113 with the predetermined length or more and in the OFF state in the state of being inserted into the housing 113 with the predetermined length or more. In this case, a grove may be formed in the housing 113 so that the lock safety switch 15 is retractable.

Meanwhile, in the embodiment, the lock safety switch 15 may be provided to maintain the state of protruding to the outside of the housing 113 if there is no external force which is applied. To this end, the lock safety switch 15 may be elastically supported by the elastic member which allows the lock safety switch 15 to maintain the protruding state.

Further, in the embodiment, an accommodation slot (not illustrated) into which the protruding portion of the lock safety switch 15 other than the pressing member 840 is inserted may be formed in the locking member 80.

Specifically, the accommodation slot may be a groove formed on a surface facing the housing 113 in the locking member 80. Further, the accommodation slot may be formed in the locking member 80 to be located at the position separated from the lock safety switch 15 when the locking member 80 is located at the first position and located at the position aligned with the lock safety switch 15 when the locking member 80 is located at the second position.

As a result, the lock safety switch 15 is in contact with and pressed by the surface facing the housing 113 in the locking member 80 when the locking member 80 mounted on the body 10 is located at the first position.

In this regard, when the locking member 80 is switched to the second position, the lock safety switch 15 and the accommodation slot are aligned, and as a result, the lock safety switch 15 protrudes toward and is accommodated in the accommodation slot by elastic force of the elastic member. Therefore, the lock safety switch 15 is switched to the ON state.

Meanwhile, even in the embodiment, similarly to the inclined surface 841 of the embodiment, at least one of the accommodation slot and/or the lock safety switch 15 may include the inclined surface so that the lock safety switch 15 is smoothly inserted into the accommodation slot and smoothly separated from the accommodation slot.

Meanwhile, in the embodiment, it is described as an example that the lock safety switch is implemented by the mechanical scheme, but the present disclosure is not limited thereto.

For example, the lock safety switch of the food processor according to another embodiment of the present disclosure may be provided as a lead switch sensing magnetic force, and the locking member 80 may include a magnetic body that switches the lock safety switch to the ON state at the second location.

In this case, the magnetic body rotates integrally with the locking member 80, and may be disposed in the locking member 80 so as to allow the lead switch to be in the OFF state when the locking member 80 is located at the first position and the lead switch to be in the ON state when the locking member 80 is located at the second position.

Hereinafter, a food processor according to an embodiment according to the present disclosure different from the above-described embodiments will be described, and a description of the same or similar component will be omitted in order to avoid a duplicate description. The food processor according to the embodiment may be configured in the same or similar scheme as the configurations of the above-described embodiments.

Figure 23:
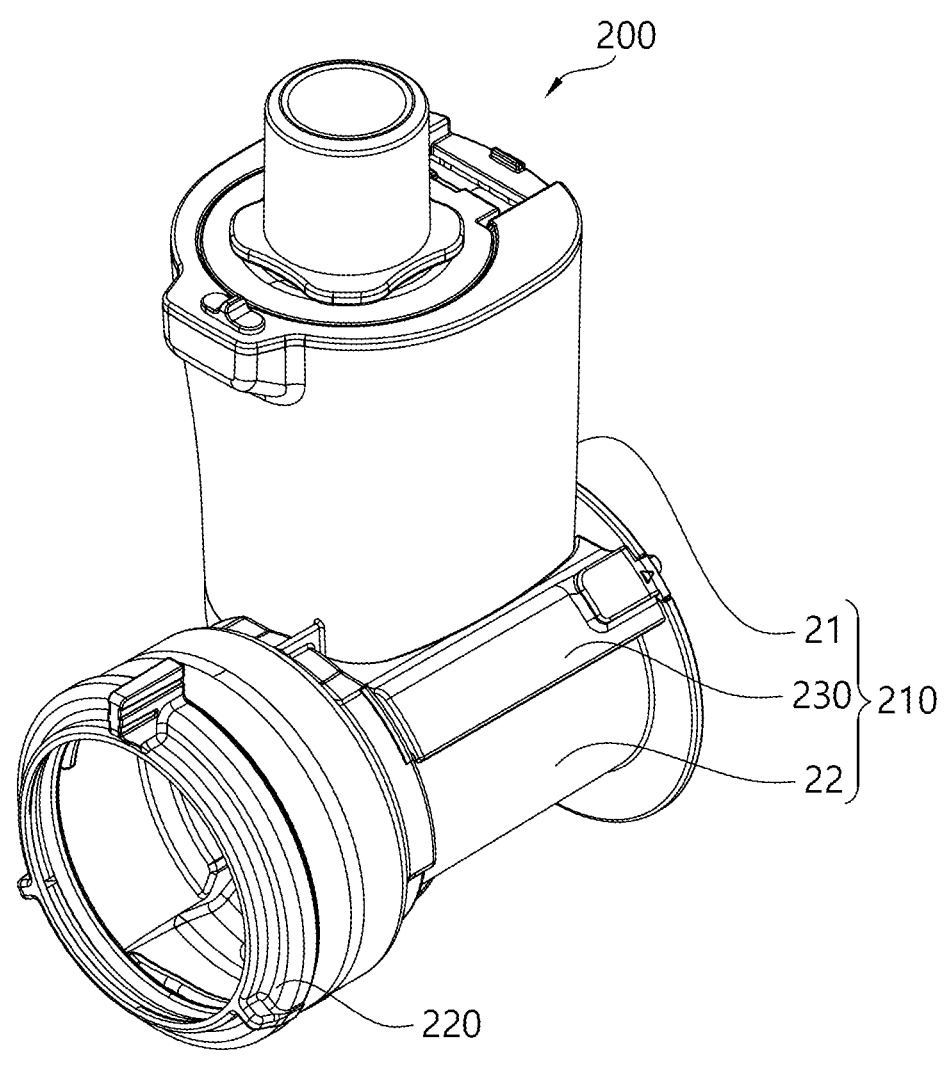
FIG. 23 is a perspective view of the container included in the food processor according to another embodiment of the present disclosure.
Figure 24:
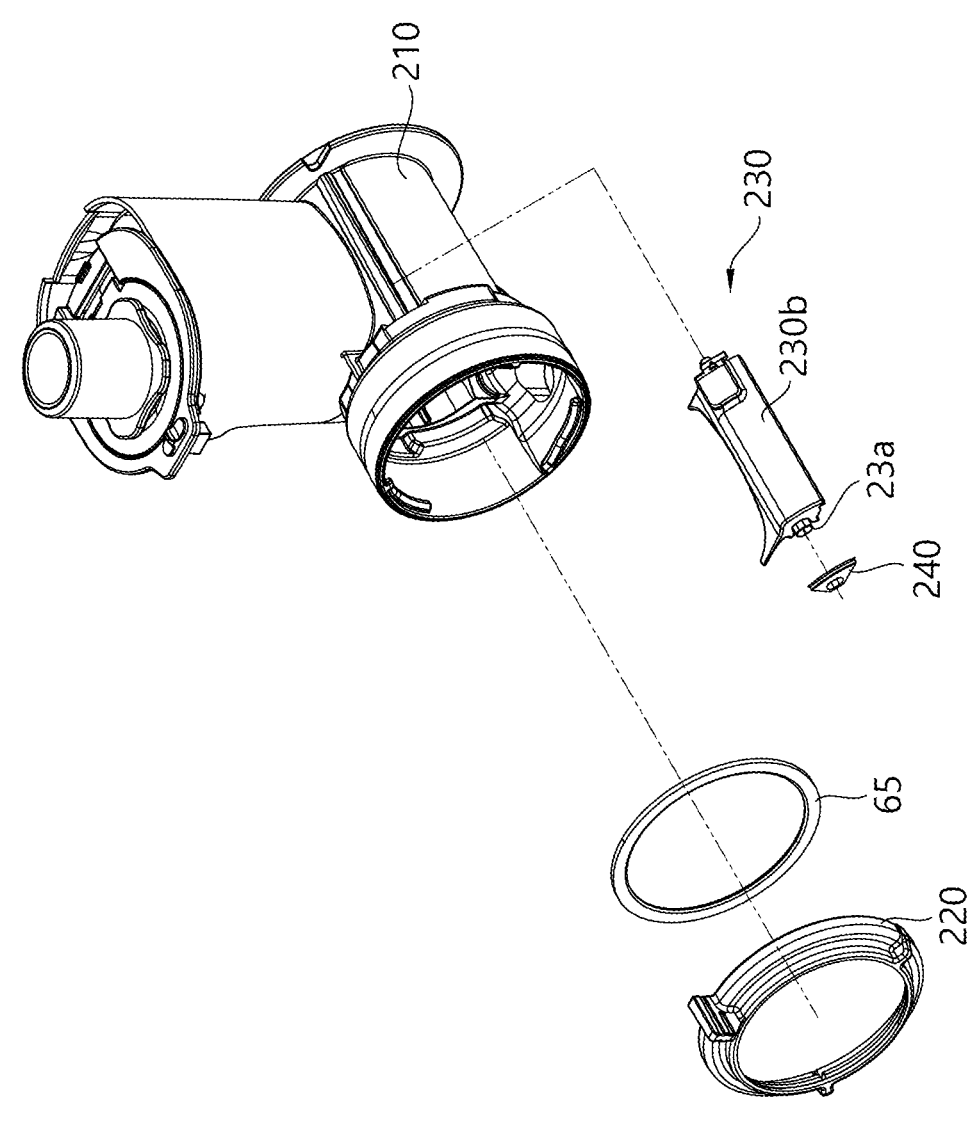
FIG. 24 is an exploded perspective view of the container included in the food processor according to another embodiment of the present disclosure.
Figure 25:
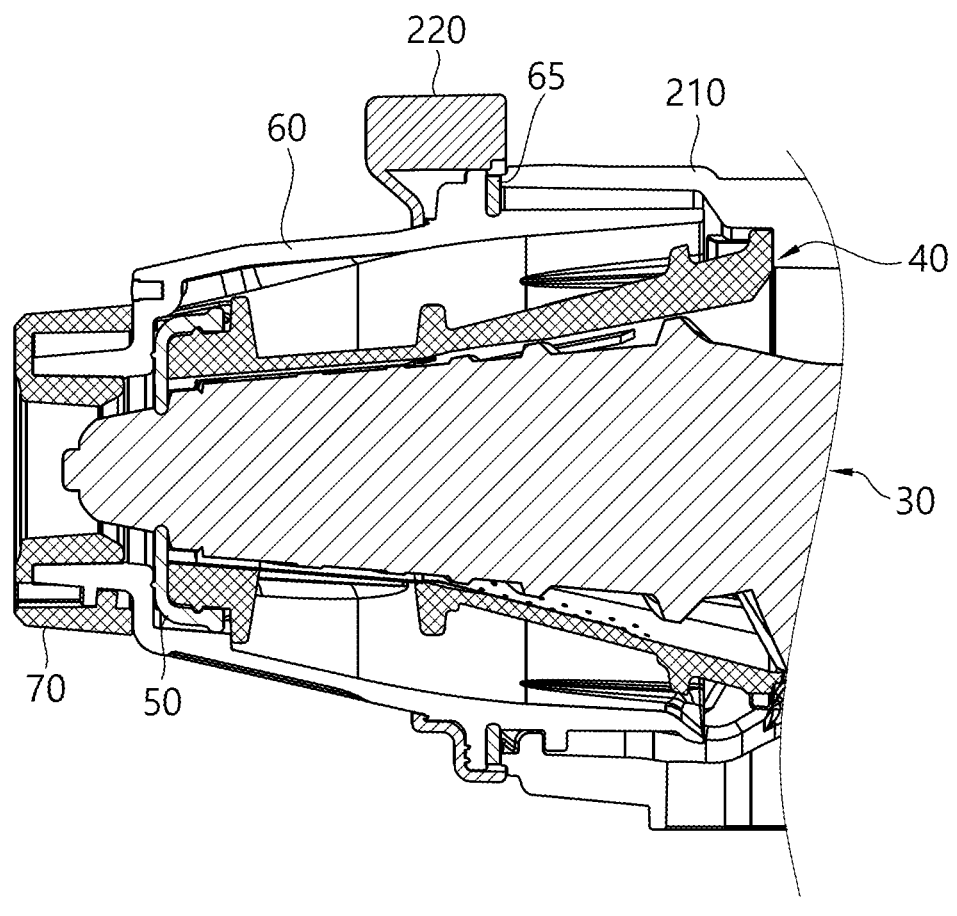
FIG. 25 is a cross-sectional view in a state in which the screw, the juicing filter, the juice discharge prevention member, the cover, and the adjustment cap of the food processor are coupled according to an embodiment of the present disclosure.

First, FIG. 23 is a perspective view of the container included in the food processor according to another embodiment of the present disclosure. FIG. 24 is an exploded perspective view of the container included in the food processor according to another embodiment of the present disclosure. FIG. 25 is a cross-sectional view in a state in which the screw, the juicing filter, the juice discharge prevention member, the cover, and the adjustment cap of the food processor are coupled according to an embodiment of the present disclosure.

As illustrated in FIGS. 23 and 24, a container 200 of the food processor according to the embodiment is configured to include a container base 210 and a base cap 220. Further, as illustrated in FIG. 24, in the embodiment, the container 200 is configured to include a switch packing 240 and a packing ring 65.

The container base 210 as a component that accommodates the screw 30, the juicing filter 40, and the cover 60 includes a material input unit 21, a material transfer unit 22, and a first safety switch unit 230 similarly to the container 20 of the above-described embodiment.

Most components of the first safety switch unit 230 may be configured in the same or similar scheme as the first safety switch unit 23 of the above-described embodiment. However, a switch housing 230b of the first safety switch unit 230 according to the embodiment may be configured integrally with the container base 210. Alternatively, the switch housing 230b according to the embodiment may be detachably configured in the container base 210.

The container cap 220 is a substantially ring-shaped member detachably configured in a front-end direction of the container base 210. For example, the container cap 220 may be mounted on the front end of the container base 210 while rotating at a predetermined angle or provided in a shape of being engagable with the front end of the container base 210 and mounted on the container base 210.

Further, the container cap 220 is mounted on the container base 210 and provides a fixation force for preventing the cover 60 from being separated. Specifically, when the container cap 220 is mounted on the container base 210 while the cover 60 is accommodated in the container base 210, the container cap 220 is closed in contact and mounted in the direction of the container base 210 to closely fix the cover 60 to the container base 210.

The packing ring 65 is a component that is disposed between the container 200 and the cover 60 to prevent the juice passing through the juicing filter 40 from leaking to the outside of the container 200. As illustrated in FIGS. 24 and 25, the packing ring 65 is configured in a substantially ring shape, and configured so that the cover 60 passes through a hole formed at the center.

Specifically, the packing ring 65 serves to seal a gap between the container 200 and the cover 60 while the cover 60 is mounted on the container 200. By referring to FIG. 25, in more detail, the packing ring 65 is located at a gap between the container base 210, the container cap 220, and the cover 60 to prevent leakage while the container base 210, the container cap 220, and the cover 60 are coupled. Such a packing ring 65 may be configured by, for example, an elastically deformable material.

When the user sequentially mounts the packing ring 65 and the cover 60 on the container base 210, and the container cap 220 on the container base 210, the packing ring 65 is elastically deformed by force with which the container cap 220 closely attaches the cover 60 and seals the gap between the container 200 and the cover 60 while the packing ring 65 is supported on the container base 210.

The switch packing 240 prevents the interior of the switch housing 230b from being contaminated as the juice is introduced into the switch housing 230b.

To this end, the switch packing 240 may be disposed adjacent to the first safety switch 23a. Specifically, the switch packing 240 is disposed to cover the first safety switch 23a to prevent the juice from penetrating the gap between the first safety switch 23a and the switch housing 230b.

In order to cover the first safety switch 23a, a penetration groove (non-reference numeral) into which the front end portion of the first safety switch 23a may be inserted may be formed in the switch packing 240. In this case, the switch packing 240 may be configured by the elastically deformable material so as to be more closely attached to the first safety switch 23a, and a diameter of the penetration groove may be provided to be slightly smaller than the diameter of the first safety switch 23a.

Further, a height of the switch packing 240 may be configured to have a height smaller than a height of an exposed portion of the first safety switch 23a in the container base 210. As a result, a front-end portion of the first safety switch 23a is exposed to the outside of the switch packing 240 while the switch packing 240 covers the first safety switch 23a.

An exposed portion of the first safety switch 23a to the outside of the switch packing 240 is pressed by the juicing filter 40 in the same or similar scheme as the above-described embodiment. As a result, the first safety switch 23a is switched to the ON state and the second safety switch 16 is also switched to the ON state.

Hereinafter, a food processor according to an embodiment according to the present disclosure different from the above-described embodiments will be described, and a description of the same or similar component will be omitted in order to avoid a duplicate description. The food processor according to the embodiment may be configured to include the components of the above-described embodiments except for a difference mentioned below.

Figure 26:
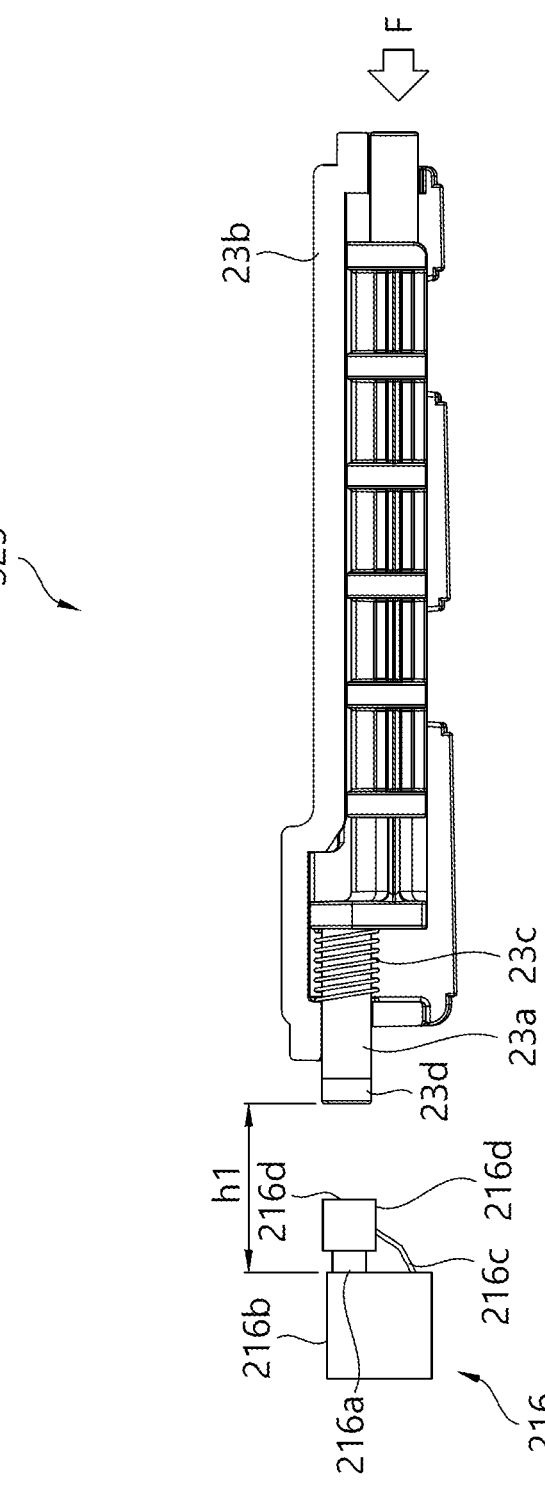
FIG. 26 is a diagram for describing the OFF state of the first safety switch and the second safety switch included in the food processor according to another embodiment of the present disclosure.

First, FIG. 26 is a diagram for describing the OFF state of the first safety switch and the second safety switch included in the food processor according to another embodiment of the present disclosure. Further, FIG. 27 is a diagram for describing the ON state of the first safety switch and the second safety switch included in the food processor according to another embodiment of the present disclosure.

Figure 27:
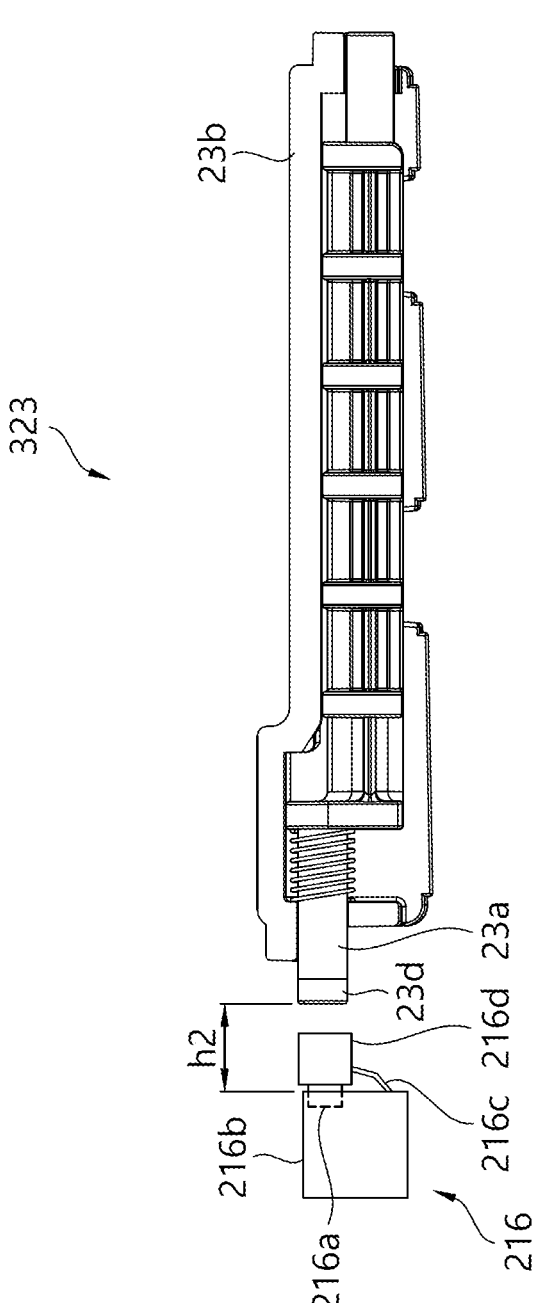
FIG. 27 is a diagram for describing the ON state of the first safety switch and the second safety switch included in the food processor according to another embodiment of the present disclosure.

As illustrated in FIGS. 26 and 27, the food processor according to the embodiment may include a first safety switch unit 323 and a second safety switch 216 of different types from the food processor according to the above-described embodiment.

First, in the embodiment, the first safety switch unit 323 includes a magnetic body 23d unlike the above-described embodiment. More specifically, the magnetic body 23d is included in the first safety switch 23a and provided to be retractable jointly with the first safety switch 23a. For example, as illustrated in FIG. 26, the magnetic body 23d may be provided at the base side of the first safety switch 23a.

When the first safety switch 23a is pressed by the juicing filter 40 and receives external force F, the magnetic body 23d moves in the direction of the second safety switch 216 and a relative distance of the first safety switch 23a and the second safety switch 216 decreases (h1>h2).

In the embodiment, the second safety switch 216 is a switch of which ON/OFF state is changed based on a relative distance change from the first safety switch 23a. The second safety switch 216 is configured to include an ON/OFF switch 216a, a switch module 216b, an elastic piece 216c, and a switching magnetic body 216d.

The switch module 216b is a module connected to the control circuit of the control unit 90 so that the control unit 90 may identify the ON/OFF state of the second safety switch 216.

The ON/OFF switch 216a is a switch provided to be retractable in the switch module 216b. As in FIG. 26, the second safety switch 216 is in the OFF state while the ON/OFF switch 216a protrudes and as in FIG. 27, the second safety switch 216 is in the ON state while the ON/OFF switch 216a is inserted into the switch module 216 to a predetermined depth or more.

The switching magnetic body 216d is a magnetic body connected to one surface of the ON/OFF switch 216a. Specifically, the switching magnetic body 216d is a component that switches the state of the ON/OFF switch 216a to the ON state by the magnetic force by approaching the relative distance from the magnetic body 23d of the first safety switch 23a.

For example, the switching magnetic body 216d may be a magnet or an electromagnet so as to form repulsive force with the magnetic body 23d. Accordingly, when the magnetic body 23d approaches as illustrated in FIGS. 26 and 27, the switching magnetic body 216*d* moves in a direction distant from the magnetic body 23*d* to press the ON/OFF switch 216*a*, and as a result, the ON/OFF switch 216*a* is switched to the ON state.

The elastic piece 216*c* is configured by an elastic material, and is a component in which one end is connected to the switching magnetic body 216*d* and the other end is connected to the switch module 216*b* to elastically support the switching magnetic body 216*d*. In this case, the elastic piece 216*c* elastically supports the switching magnetic body 216*d* so that the ON/OFF switch 216*a* is in the OFF state when the first safety switch 23*a* is in the OFF state.

Specifically, when the first safety switch 23*a* is in the OFF state, the elastic force by the elastic piece 216*c* prevails the magnetic force by the switching magnetic body 216*d* and the magnetic body 23*d* and the ON/OFF switch 216*a* is in the OFF state, and on the contrary, when the first safety switch 23*a* is in the ON state, the magnetic force by the switching magnetic body 216*d* and the magnetic body 23*d* prevails the elastic force by the elastic piece 216*c*, and the ON/OFF switch 216*a* is in the ON state.

In the above description, it is described as an example that the second safety switch 216 is in the OFF state while the ON/OFF switch 216*a* protrudes and the second safety switch 216 is in the ON state while the ON/OFF switch 216*a* is inserted into the switch module 216*b* to a predetermined depth or more, but the present disclosure is not limited thereto.

For example, in the present disclosure, it is also possible that the second safety switch 216 is provided to become in the ON state while the ON/OFF switch 216*a* protrudes and the second safety switch 216 is provided to become in the OFF state while the ON/OFF switch 216*a* is inserted into switch module 216*b* to a predetermined depth or more.

In this case, the elastic piece 216*c* elastically supports the switching magnetic body 216*d* so that the ON/OFF switch 216*a* maintains a state of being inserted into the switch module 216*b*. Further, in this case, when the magnetic body 23*d* approaches, the switching magnetic body 216*d* may be a magnet or an electromagnet which mutually forms an attraction with the magnetic body 23*d* so as to tract the ON/OFF switch 216*a* to the outside of the switch module 216*b* by using the magnetic force.

Hereinafter, a food processor according to an embodiment according to the present disclosure different from the above-described embodiments will be described, and a description of the same or similar component will be omitted in order to avoid a duplicate description. The food processor according to the embodiment may be configured to include the components of the above-described embodiments except for a difference mentioned below.

Figure 28:
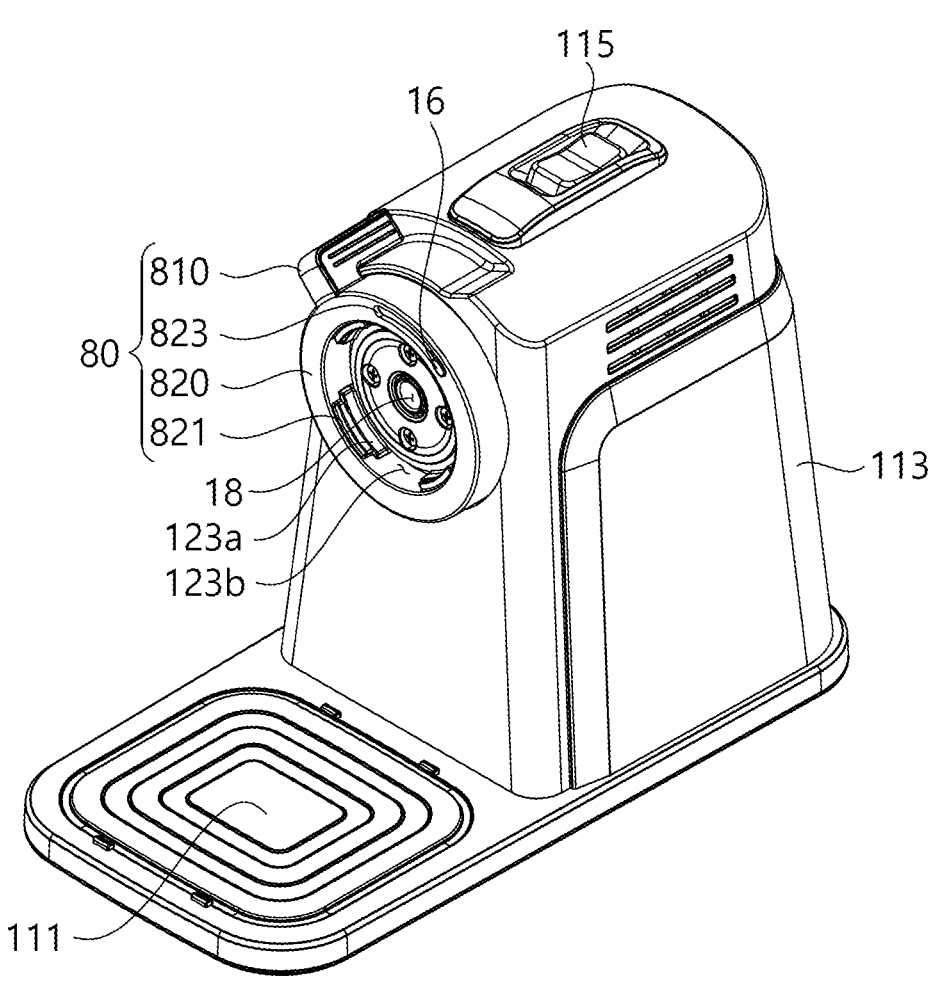
FIG. 28 is a diagram illustrating a body in the state in which the locking member is located at the first position according to another embodiment of the present disclosure.
Figure 29:
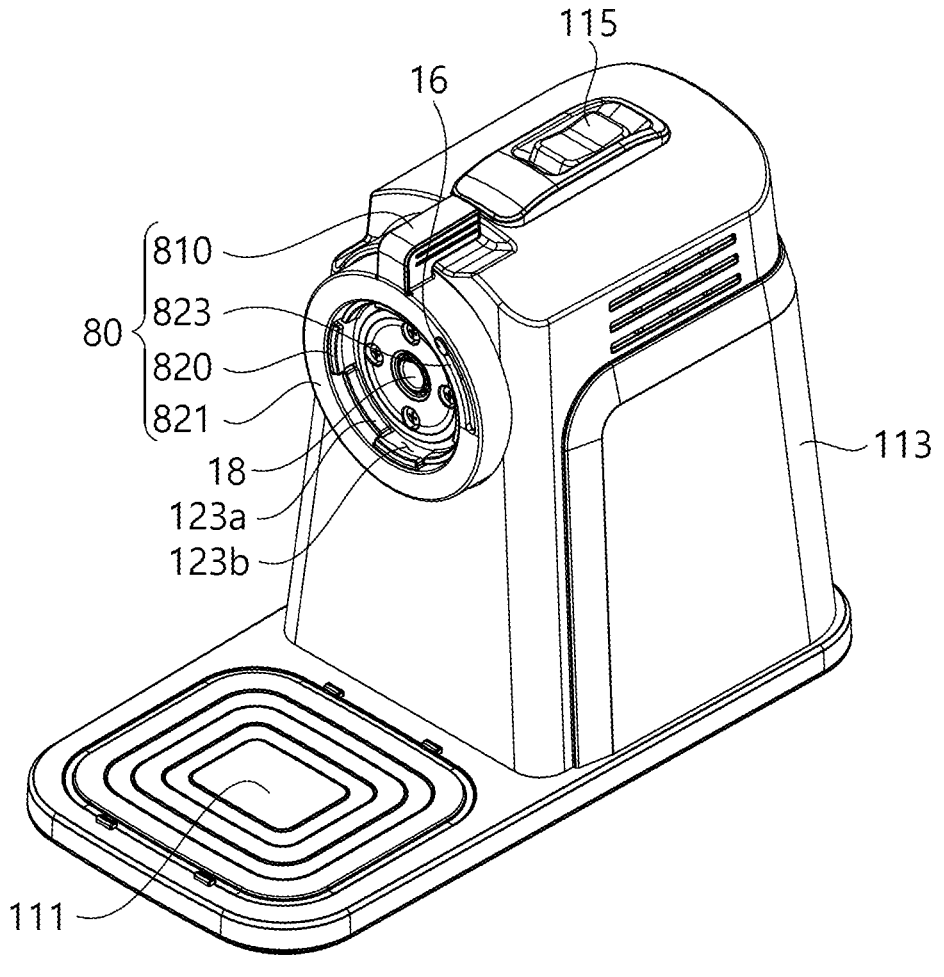
FIG. 29 is a diagram illustrating the body in the state in which the locking member is located at the second position according to another embodiment of the present disclosure.
Figure 30:
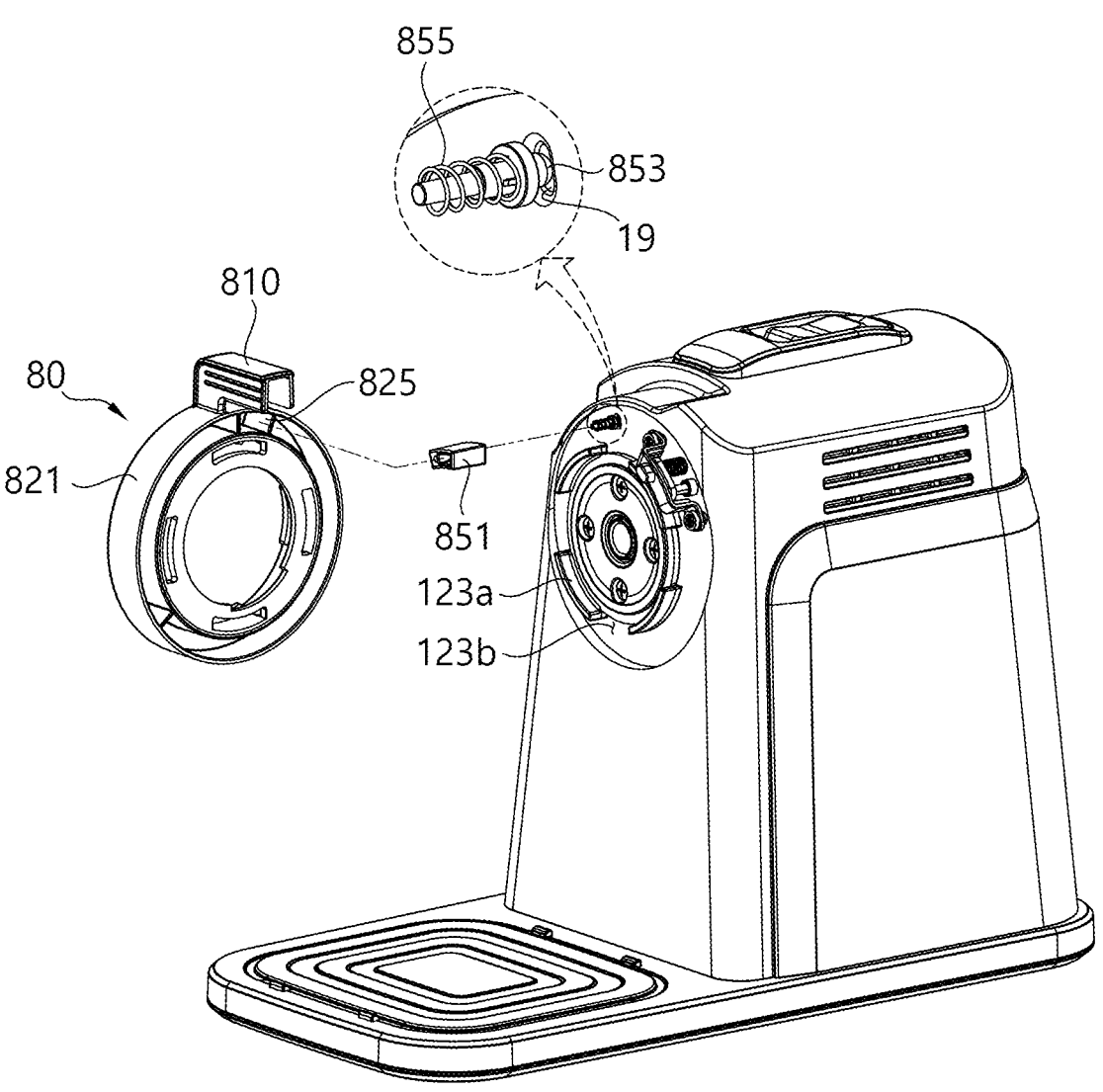
FIG. 30 is a diagram for describing components of the body according to another embodiment of the present disclosure.

First, FIG. 28 is a diagram illustrating a body in the state in which the locking member is located at the first position according to another embodiment of the present disclosure. FIG. 29 is a diagram illustrating the body in the state in which the locking member is located at the second position according to another embodiment of the present disclosure. FIG. 30 is a diagram for describing components of the body according to another embodiment of the present disclosure.

As illustrated in FIGS. 28 to 30, the food processor according to the embodiment is configured so that the locking member 80 is included in the body 10 unlike the above-described embodiments. That is, in the embodiment, the locking member 80 may be integrated into the body 10.

Specifically, in the embodiment, the body 10 includes the stage 111, the housing 113, the power switch 115, and the locking member 80. In this case, the locking member 80 is coupled to the exterior of the housing 113.

Meanwhile, in the embodiment, a plurality of support ends 123*a* and coupling end accommodation grooves 123*b* are formed in the housing 113 unlike the above-described embodiments.

The plurality of support ends 123*a* protrudes from the surface of the housing 113. Further, the plurality of support ends 123*a* is adjacent to the second coupling end 821 of the locking member 80, but is located at the interior of the body 10 further than the second coupling end 821.

In this regard, the coupling end accommodation groove 123*b* is a space accommodating the first coupling end 25*b*. The coupling end accommodation groove 123*b* may be formed by a space between the plurality of support ends 123*a* which protrudes from the housing 113.

Meanwhile, referring to FIG. 30, it is illustrated that in the embodiment, the housing accommodation groove 825 is formed at an upper side of the locking member 80 and the hit portion 19 is formed at a position corresponding thereto in the housing 113, but the present disclosure is not limited thereto. That is, those skilled in the art may appropriately change the positions of the housing accommodation groove 825 and the hit portion 19, and it should be interpreted that in the present disclosure, the claims are applied to all of the changed embodiments.

By the food processor according to the embodiments of the present disclosure, even though the power switch 115 is switched to the ON state, when the lock safety switch 15 and the second safety switch 16 are not in the ON state, the control unit 90 prevents the operation of the motor 113*b*.

Therefore, according to the present disclosure, while the screw 30 is exposed or the container 20 is fixed to the body 10, the operation of the motor 113*b* is prevented, thereby preventing the safety accident to due to mishandling by the user.

Meanwhile, in the above-described embodiments, it is described that the ON/OFF states of the first safety switch units 23, 230, and 323, the second safety switches 16 and 216, and the lock safety switch 15 are switched based on the mechanical scheme, but the present disclosure is not limited thereto.

For example, the first safety switch units 23, 230, and 323 may be configured by various configurations that detect whether the cover 60 and/or the juicing filter 40 are/is mounted on the container 20.

As a more specific example, the cover 60 and/or the juicing filter 40 may include the magnetic body, and the first safety switch units 23, 230, and 323 may include a lead switch of which ON/OFF state is switched according to the approach of the magnetic body. Alternatively, the first safety switch units 23, 230, and 323 may be provided to include a sensor sensing a change in magnetic force to identify the mounting of the cover 60 and/or the juicing filter 40.

Alternatively, as another example, the first safety switch units 23, 230, and 323 may be provided to include an optical sensor such as an infrared sensor, etc., to identify the mounting of the cover 60 and/or the juicing filter 40. In this case, the first safety switch units 23, 230, and 323 may include a light emitting unit and a light receiving unit sensing light of the light emitting unit. In this case, the first safety switch units 23, 230, and 323 may be provided to be switched to the ON state when the cover 60 and/or the juicing filter 40 are/is mounted and the light of the light emitting unit irradiated toward the light receiving unit is blocked by the cover 60 and/or the juicing filter 40.

The second safety switches 16 and 216 may also be provided as various components that sense state changes of the first safety switches 23, 230, and 323 in the same or similar scheme as the first safety switch units 23, 230, and 323.

For example, the second safety switches 16 and 216 may be connected to the first safety switch units 23, 230, and 323 wiredly/wirelessly, and when the first safety switch units 23, 230, and 323 are in the ON state, the first safety switch units 23, 230, and 323 may transmit signals to the second safety switches 16 and 216. In this case, when the second safety switches 16 and 216 receive the signals from the first safety switch units 23, 230, and 323, the second safety switches 16 and 216 may be provided to be switched to the ON state. Alternatively, the first safety switch units 23, 230, and 323 may include an electromagnet magnetized to the ON state, and the second safety switches 16 and 216 may be provided as the lead switch or the magnetic sensor corresponding thereto.

The lock safety switch 15 may also be provided as various components that recognize whether the container 20 is fixed to the body 10. For example, the lock safety switch 15 may be provided to include the electromagnet magnetized when the locking member 80 is located at the second position and the magnetic sensor recognizing the magnetic force of the electromagnet.

Meanwhile, in the above-described embodiments, it is described that the first safety switch unit 23*a* is switched to the ON state by the juicing filter 40 while the cover 60 is coupled to the container 20, but the present disclosure is not limited thereto. For example, when the first safety switch 23*a* may be formed to be directly pressed to/contacted with the cover 60 and switched to the ON state when the cover 60 is mounted on the container 20. In addition, it should be interpreted that the changed embodiments are also included in the claims of the present disclosure.

It will be appreciated that those skilled in the technical field to which the present disclosure belongs may be implemented in other specific forms without changing the technical spirit or essential features. Therefore, it should be appreciated that the aforementioned embodiments are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

The invention claimed is:

1. A food processor comprising:
a body;
a container detachably coupled to the body;
a screw connected to the body while at least a part is accommodated in the container;
a juicing filter disposed to cover a front end side of the screw; and
a cover detachably coupled to a front end side of the container,
wherein the container includes a first safety switch exposed toward the front end side of the container and disposed in the container,
wherein the first safety switch is switched to an ON state by the juicing filter while the cover is coupled to the container, wherein the container further includes:
a cover coupling unit formed on a front end and coupled to the cover; and
a filter support unit formed at a base side rather than the cover coupling unit and contacting the juicing filter, and
wherein the cover coupling unit is formed on an outer side of the filter support unit, the juicing filter is accommodated in a space between the container and the cover, the first safety switch is provided to be retractable from the filter support unit, and the cover presses the juicing filter to a container side while being coupled to the container to allow the juicing filter to switch the first safety switch to the ON state.

2. The food processor of claim 1, wherein the body includes
a second safety switch switched to the ON state as the first safety switch is switched, and
a motor providing power to the screw while the second safety switch is switched to the ON state.

3. The food processor of claim 1, wherein the body includes a locking member fixing the container to the body, and
the locking member is provided to move between a first position which allows the container to be separated from the body and a second position which allows the container to be fixed to the body.

4. The food processor of claim 3, wherein the body includes a second safety switch switched to the ON state as the first safety switch is switched and a motor providing the power to the screw while the second safety switch is switched to the ON state, and
the second safety switch is exposed toward the container side through the locking member.

5. The food processor of claim 4, wherein the locking member has a slit which moves along the second safety switch so that the second safety switch maintains an exposed state while the locking member moves between the first position and the second position.

6. The food processor of claim 3, wherein the body further includes a sound generation unit generating a sound when the locking member is switched from the first position to the second position.

7. The food processor of claim 6, wherein the sound generation unit includes
a hitting portion,
an elastic member elastically supporting the hitting portion, and
a hit portion aligned with the hitting portion while the locking member is located at the second position, and
when the locking member is switched from the first position to the second position, the hitting portion collides with the hit portion by elastic force of the elastic member to generate the sound.

8. The food processor of claim 1, wherein the cover presses the juicing filter to the container side while the cover is directly coupled to the container to make the juicing filter press the first safety switch to switch the first safety switch to the ON state.

* * * * *